(12) United States Patent
Omura

(10) Patent No.: US 11,054,689 B2
(45) Date of Patent: Jul. 6, 2021

(54) ELECTRIC DEVICE AND DISPLAY DEVICE

(71) Applicant: KYOCERA Document Solutions Inc., Osaka (JP)

(72) Inventor: Hiroyoshi Omura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 103 days.

(21) Appl. No.: 16/507,617

(22) Filed: Jul. 10, 2019

(65) Prior Publication Data

US 2020/0019011 A1    Jan. 16, 2020

(30) Foreign Application Priority Data

Jul. 11, 2018  (JP) ............................. JP2018-131396

(51) Int. Cl.
| | |
|---|---|
| *G09G 3/00* | (2006.01) |
| *G02F 1/1335* | (2006.01) |
| *G02F 1/1362* | (2006.01) |
| *H04N 1/00* | (2006.01) |

(52) U.S. Cl.
CPC .. *G02F 1/133509* (2013.01); *G02F 1/136286* (2013.01); *H04N 1/00129* (2013.01); *H04N 1/00408* (2013.01)

(58) Field of Classification Search
USPC .............. 345/32, 173, 156; 377/77; 386/225
See application file for complete search history.

(56) References Cited

U.S. PATENT DOCUMENTS

| | | | |
|---|---|---|---|
| 2002/0145770 A1* | 10/2002 | Nomura ............. | H04N 1/00408 358/505 |
| 2008/0041961 A1* | 2/2008 | Silverbrook ............... | B41J 3/44 235/462.43 |
| 2009/0053850 A1* | 2/2009 | Nishida ............. | H01L 27/14618 438/64 |
| 2015/0016585 A1* | 1/2015 | Toyotaka ............... | G11C 19/28 377/77 |
| 2015/0063778 A1* | 3/2015 | Kwon ..................... | G11B 27/11 386/225 |
| 2015/0270227 A1* | 9/2015 | Dinh ................. | H01L 23/49838 361/750 |
| 2016/0313490 A1* | 10/2016 | Steijner ............. | G02F 1/133615 |

(Continued)

FOREIGN PATENT DOCUMENTS

JP            11204980 A       7/1999

*Primary Examiner* — Thuy N Pardo
(74) *Attorney, Agent, or Firm* — Alleman Hall Creasman & Tuttle LLP

(57) ABSTRACT

An electric device includes a substrate, a first wire, a filter, a storage portion, and a holding member. The first wire includes a base end portion that is electrically connected with a electronic circuit of the substrate. The storage portion includes a bottom portion and an inner peripheral portion. The storage portion stores the filter with the first wire inserted in a through hole thereof and stores a specific portion of the first wire. The holding member protrudes from the inner peripheral portion. The holding member includes an interposed portion and a position regulating portion. The position regulating portion abuts on the filter, from two sides of a second direction that is perpendicular to the first direction, and from one side of a third direction that is perpendicular to the first direction and the second direction, in such a way as to regulate a position of the filter.

10 Claims, 14 Drawing Sheets

(56) References Cited

U.S. PATENT DOCUMENTS

2017/0037556 A1* 2/2017 Doyle .................... D06F 33/00
2017/0317374 A1* 11/2017 Takahashi .............. H01G 11/60
2020/0254169 A1* 8/2020 Fulkerson ........... A61M 1/3639

* cited by examiner

ELECTRIC DEVICE AND DISPLAY DEVICE

INCORPORATION BY REFERENCE

This application is based upon and claims the benefit of priority from the corresponding Japanese Patent Application No. 2018-131396 filed on Jul. 11, 2018, the entire contents of which are incorporated herein by reference.

BACKGROUND

The present disclosure relates to an electric device in which a filter is attached to a wire, and relates to a display device including the electric device.

In general, in an electric device, a wire including a signal line or a power line is inserted in a filter that includes a ferrite core or the like, to remove noises.

SUMMARY

An electric device according to an aspect of the present disclosure includes a substrate, a first wire, a filter, a storage portion, and a holding member. An electronic circuit is mounted on the substrate. The first wire includes a base end portion that is electrically connected with the electronic circuit. The filter has a through hole in which the first wire is inserted. The storage portion includes a bottom portion and an inner peripheral portion that defines a shape of an opening at a position separated from the bottom portion in a first direction. The storage portion stores the filter with the first wire inserted in the through hole thereof and stores a specific portion of the first wire, the specific portion extending from the base end portion to the filter. The holding member is formed from a flexible material and attached to the storage portion so as to protrude from the inner peripheral portion toward the opening. The holding member includes an interposed portion and a position regulating portion. The interposed portion is interposed between the inner peripheral portion and the specific portion. The position regulating portion abuts on the filter stored in the storage portion, from two sides of a second direction that is perpendicular to the first direction, and from one side of a third direction that is perpendicular to the first direction and the second direction, in such a way as to regulate a position of the filter in the storage portion.

A display device according to another aspect of the present disclosure includes the electric device and a display portion. The display portion displays an image based on image data transmitted from the electronic circuit.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

Figure 2:
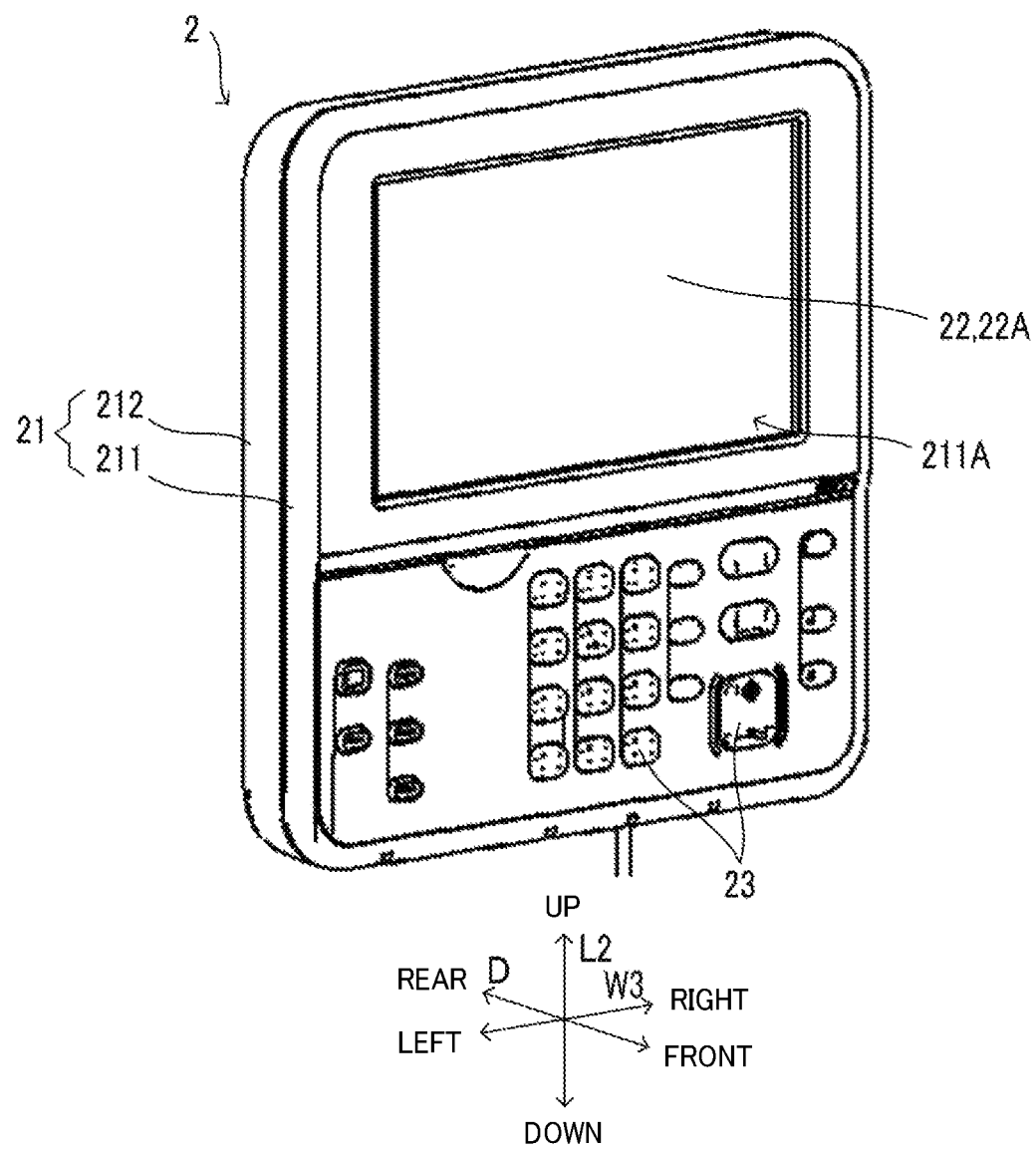
FIG. 2 is a perspective diagram of an operation/display portion in FIG. 1 viewed from a front side.
Figure 5:
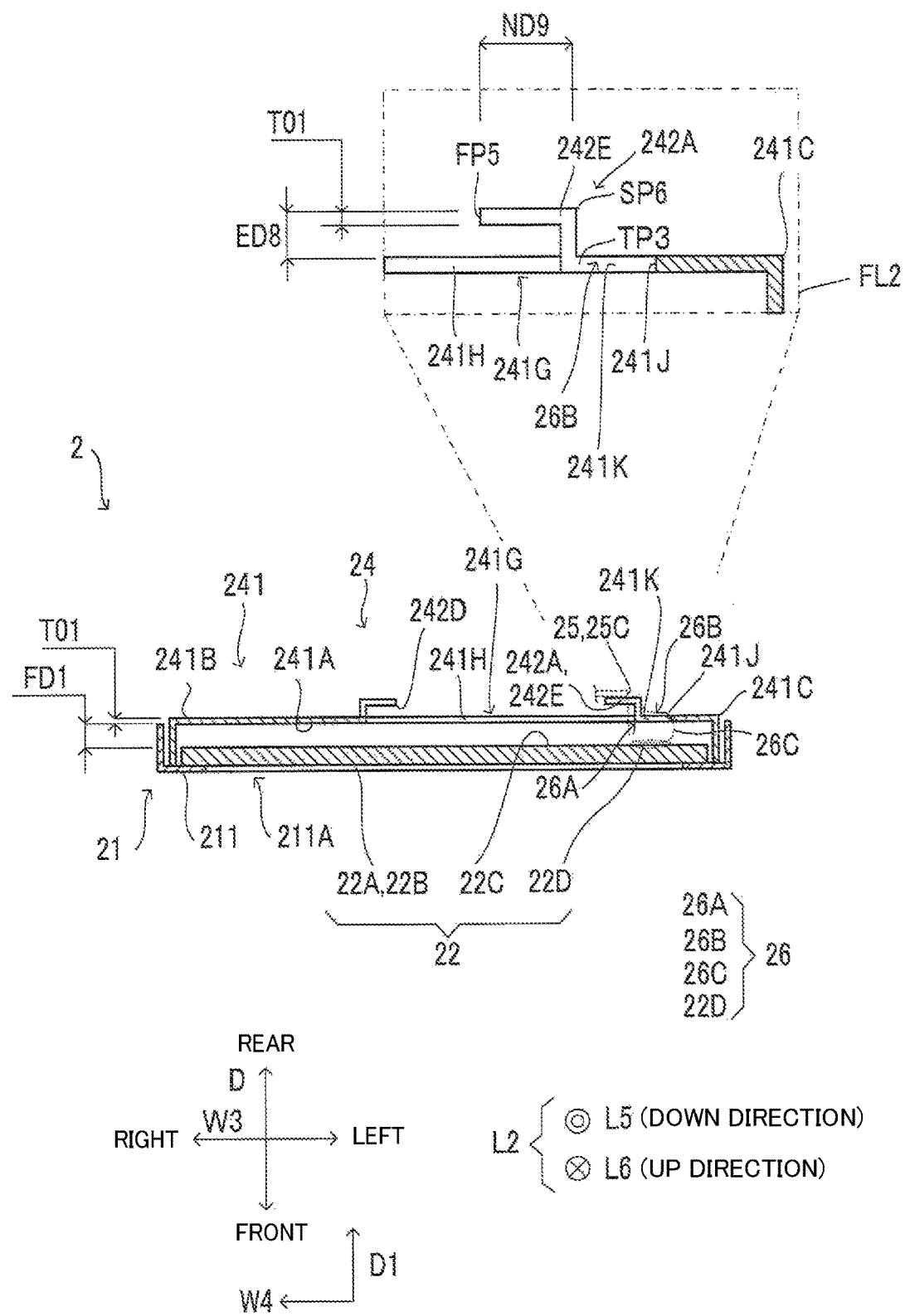
FIG. 5 is a schematic cross-sectional diagram of the operation/display portion taken along a one-dot chain line V-V in FIG. 4 viewed from below, showing the operation/display portion before a substrate is attached thereto.

In FIG. 2, the arrow D indicates a front-rear direction of an operation/display portion 2 that is described below. It is noted that the front-rear direction indicated by the arrow D is perpendicular to a first main surface 22B and a second main surface 22C (see FIG. 5) of a display portion 22 that are described below. In FIG. 5, the arrow D1 indicates a first direction that is, among directions perpendicular to the first main surface 22B and the second main surface 22C, a direction directed from the first main surface 22B to the second main surface 22C. Hereinafter, the front-rear direction is referred to as a front-rear direction D. In addition, the first direction is referred to as a first direction D1.

In FIG. 2, the arrow L2 indicates an up-down direction of the operation/display portion 2. It is noted that, as shown in FIG. 5, the arrow L2 indicates the same direction as a second direction that is perpendicular to the first direction D1. The arrow L5 indicates a fifth direction that is directed from one side of the second direction to the other side thereof. The arrow L6 indicates a sixth direction that is directed from the other side of the second direction to the one side thereof. Specifically, the fifth direction is a direction directed downward (a down direction) with respect to the operation/display portion 2. The sixth direction is a direction directed upward (an up direction) with respect to the operation/ display portion 2. Hereinafter, the up-down direction is referred to as an up-down direction L2, and the second direction is referred to as a second direction L2.

In FIG. 2, the arrow W3 indicates a left-right direction of the operation/display portion 2. It is noted that the arrow W3 indicates a third direction that is perpendicular to the first direction D1 and the second direction L2 (see FIG. 6). In FIG. 5, the arrow W4 indicates a fourth direction that is directed from one side of the third direction to the other side thereof. The fourth direction is a direction directed from left to right with respect to the operation/display portion 2 (the right direction). Hereinafter, the left-right direction is referred to as a left-right direction W3, and the third direction is referred to as a third direction W3. In addition, the fourth direction is referred to as a fourth direction W4.

Figure 1:
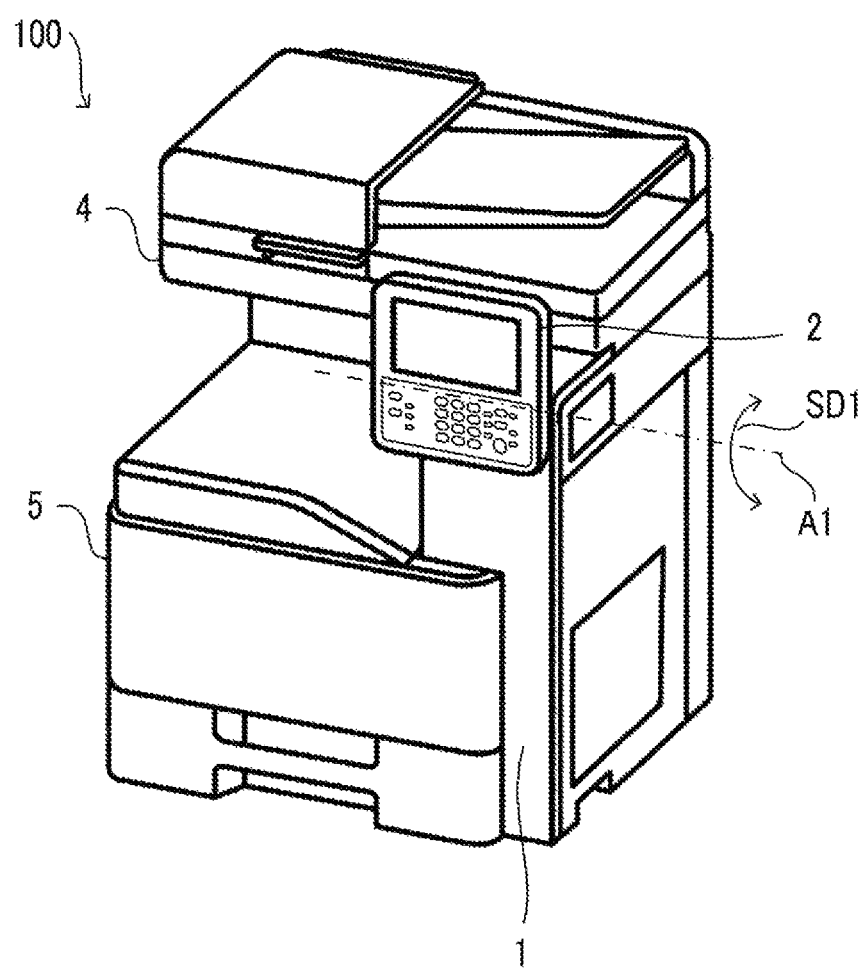
FIG. 1 is a schematic diagram showing an outer appearance of an image forming apparatus according to an embodiment of the present disclosure.

In FIG. 1, an image forming apparatus 100 is a printer, a copier, a multifunction peripheral or the like. The multifunction peripheral has a plurality of functions such as a print function, a copy function, a facsimile function, and a scan function. The image forming apparatus 100 includes a housing 1, an operation/display portion 2, an image reading portion 4, and an image forming portion 5.

The housing 1 includes a frame and an exterior body. The housing 1 stores the image reading portion 4, the image forming portion 5, and a control portion (not shown).

Figure 3:
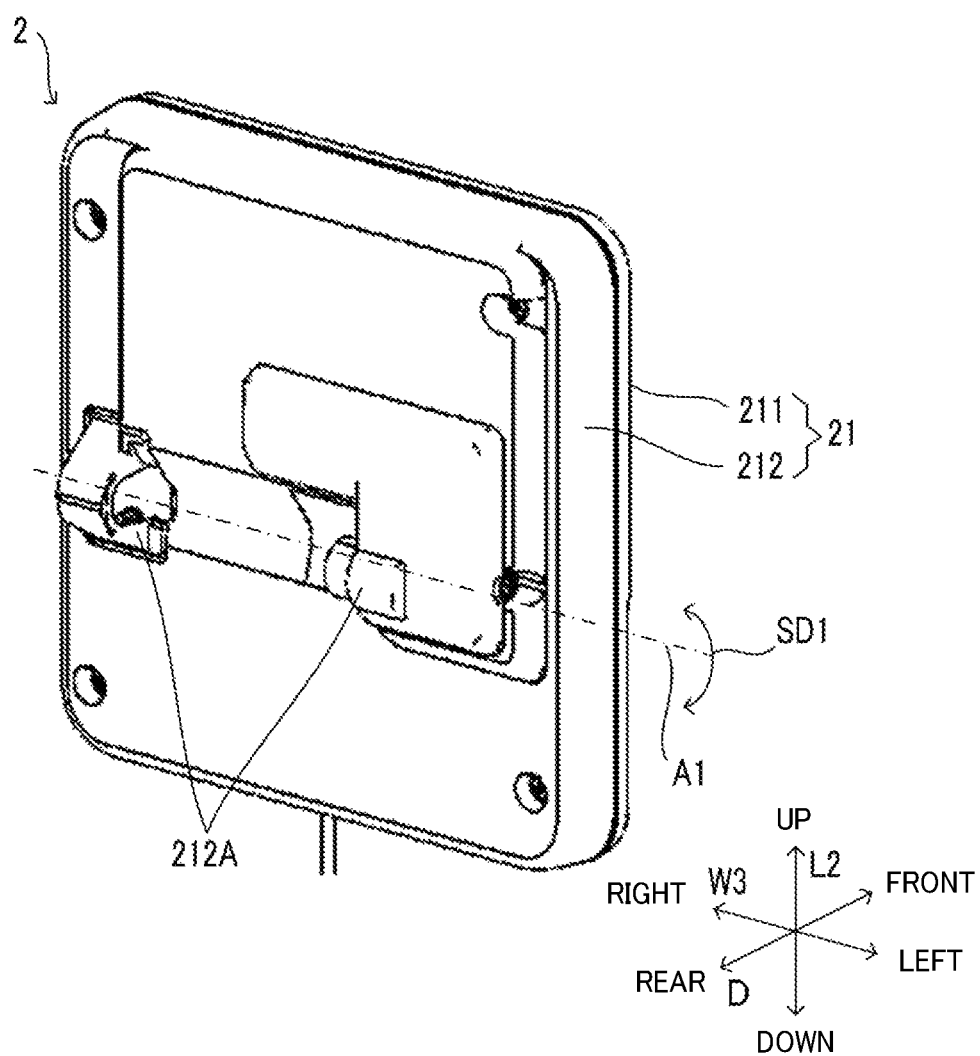
FIG. 3 is a perspective diagram of the operation/display portion in FIG. 1 viewed from a rear side.

The operation/display portion 2 is provided on an upper part of a front surface of the housing 1. As shown in FIG. 2 and FIG. 3, the operation/display portion 2 includes a housing 21, a display portion 22, and an operation portion 23. The operation/display portion 2 further includes a frame portion 24, a substrate 25 (see FIG. 4), a storage portion 26 (see FIG. 9), a first wire 27A, a second wire 27B, a filter 28, and a holding member 29 (see FIG. 4). The operation/display portion 2 is an example of the electric device and the display device of the present disclosure. Specifically, the electric device includes the frame portion 24, the substrate 25, the storage portion 26, the first wire 27A, the second wire 27B, the filter 28, and the holding member 29. The display device includes the display portion 22 and the electric device.

As shown in FIG. 2, the housing 21 is an exterior body of the operation/display portion 2, and includes a front casing 211 and a rear casing 212. The front casing 211 is a front exterior body of the housing 21. The rear casing 212 is a rear exterior body of the housing 21. The display portion 22, the operation portion 23, the frame portion 24, and the substrate 25 are disposed inside the front casing 211 and the rear casing 212 (see FIG. 4). In this state, the rear casing 212 is attached to the front casing 211 by a plurality of screws.

As shown in FIG. 3, bearings 212A are provided on an outer surface of the rear casing 212. A shaft (not shown) that is provided on a front surface of the housing 1 (see FIG. 1) is inserted in the bearings 212A. This allows the operation/display portion 2 to pivot in a pivot direction SD1 around a rotation axis A1 with respect to the housing 1. The rotation axis A1 extends in the left-right direction W3.

As shown in FIG. 2, the display portion 22 is, for example, a liquid crystal display panel including a deflection filter, a glass substrate, a liquid crystal, and a back light. The display portion 22 displays an image on a display area 22A of a rectangular shape. The operation portion 23 is, for example, composed of a plurality of operation buttons for receiving user operations. It is noted that for the sake of convenience, a reference sign "23" is placed at only two operation buttons.

A plurality of through holes are formed in the front casing 211. The through holes penetrate through the front casing 211 from the front side to the rear side. One of the plurality of through holes is a display through hole 211A that is provided in an upper part of the front casing 211. The size of the display through hole 211A corresponds to the size of the display area 22A of the display portion 22. The display portion 22 is disposed immediately behind the front casing 211 such that the display area 22A is exposed on the front side of the operation/display portion 2 through the display through hole 211A.

The remaining through holes (hereinafter referred to as operation through holes) other than the display through hole 211A are provided in a lower part of the front casing 211. The operation through holes have shapes and sizes that respectively correspond to the plurality of operation buttons. The plurality of operation buttons are arranged on an operation substrate (not shown). The operation substrate is disposed immediately behind the front casing 211. In addition, the plurality of operation buttons are exposed on the front side of the operation/display portion 2 through the corresponding operation through holes.

In FIG. 1, the image reading portion 4 is a scanner including a document sheet table, a light source, a mirror, an optical lens, and a CCD (Charge Coupled Device). The image reading portion 4 optically reads a document sheet conveyed by what is called an ADF (Automatic Document Feeder), or a document sheet placed on a document sheet table glass (not shown). The image reading portion 4 transmits image data that represents an image read from the document sheet, to a control portion (not shown) of the image forming apparatus 100.

The image forming portion 5 is an image forming unit configured to generate a print by forming an image on a sheet based on the image data by an electrophotographic method or an inkjet method. In a case where the electrophotographic method is adopted, the image forming portion 5 includes a photoconductor drum, a charger, an exposure device, a developing device, a transfer device, and a fixing device.

Next, a detailed description of the operation/display portion 2 is provided with reference to FIG. 4 to FIG. 14.

As shown in FIG. 5, the display portion 22 includes the first main surface 22B and the second main surface 22C that are separated from each other in the front-rear direction D. A front surface of the display portion 22 is the first main surface 22B, and a rear surface of the display portion 22 is the second main surface 22C. Each of the first main surface 22B and the second main surface 22C has a rectangular shape and is larger in size than the display through hole 211A provided in the front casing 211. The first main surface 22B includes the display area 22A.

The display portion 22 is disposed in the front casing 211. The first main surface 22B abuts on the rear surface of the front casing 211 (namely, the inner surface of the housing 21). The second main surface 22C is separated rearward from the first main surface 22B.

Figure 6:
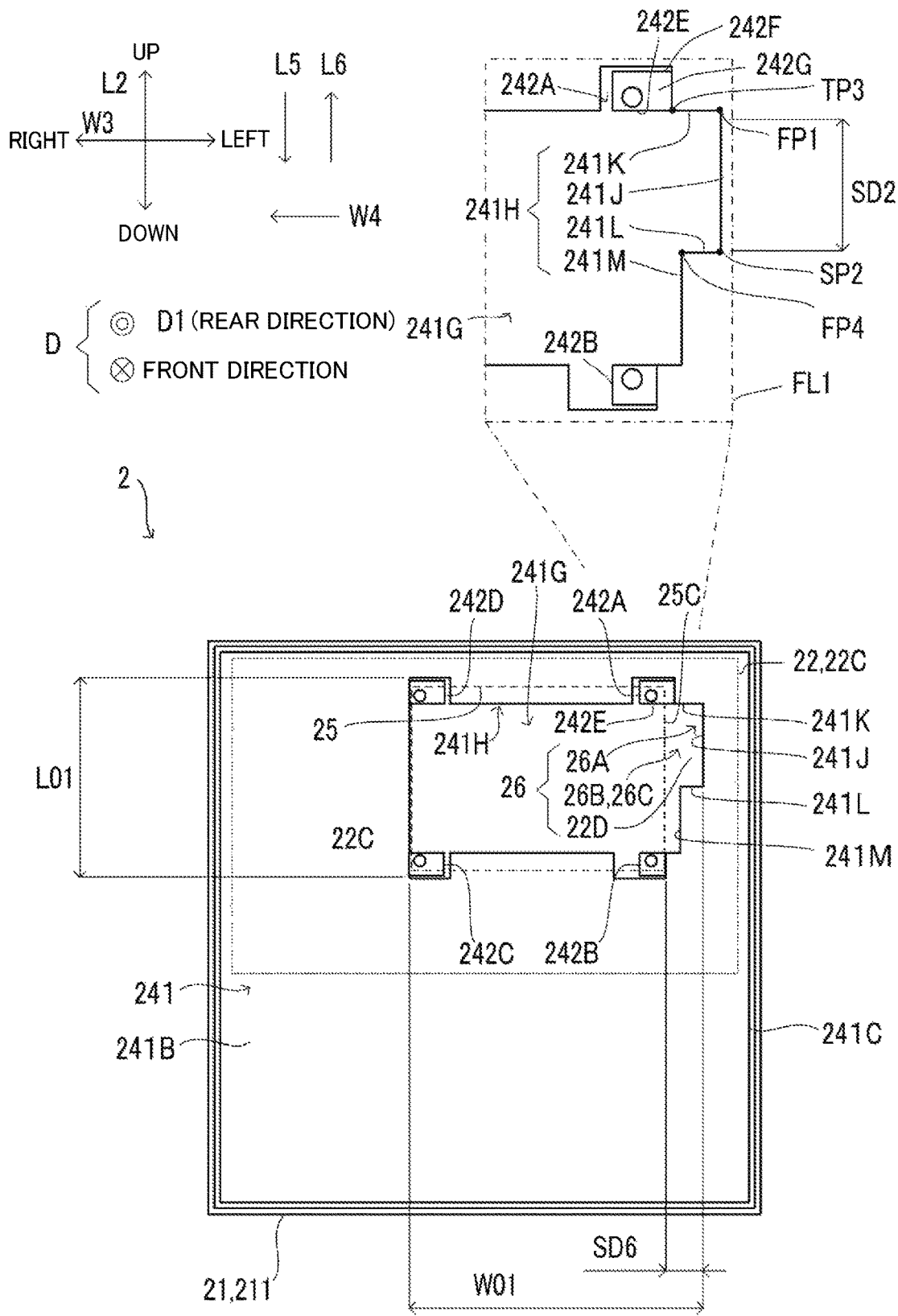
FIG. 6 is a schematic diagram of a frame portion in FIG. 4 viewed from rear, showing the operation/display portion before the substrate is attached thereto.
Figure 9:
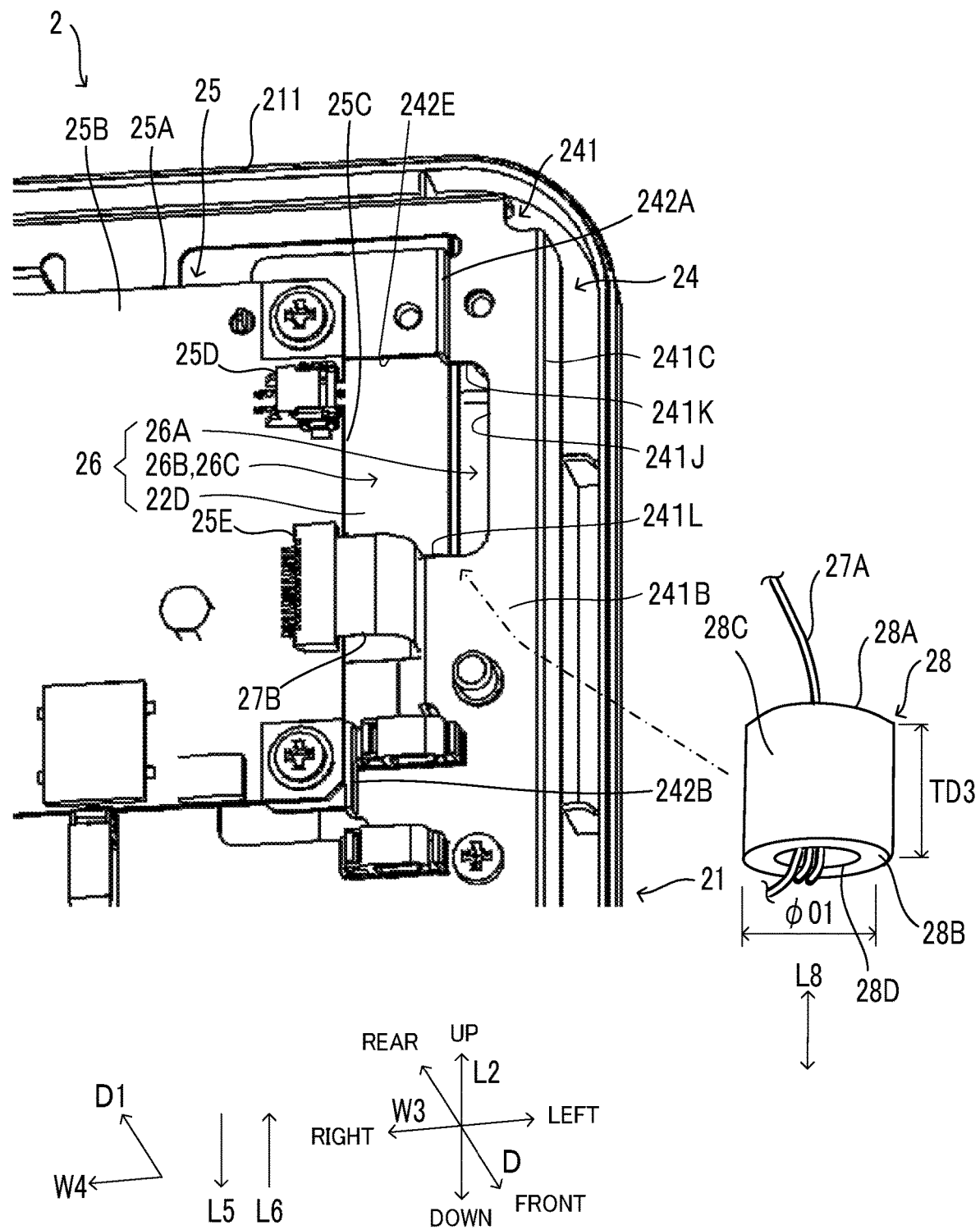
FIG. 9 is an enlargement diagram of a storage portion in FIG. 6 viewed from diagonally rear, showing the operation/display portion before a filter is attached thereto.

A bottom portion 22D is demarcated in the second main surface 22C, wherein the bottom portion 22D serves as a bottom portion of the storage portion 26 (see FIG. 9). The bottom portion 22D is a portion of the second main surface 22C that is indicated by a dotted line ellipse in FIG. 5. Specifically, as shown in FIG. 6, the bottom portion 22D is located at an upper left corner of the second main surface 22C of the display portion 22. More specifically, in a plan view seen from the rear of the second main surface 22C, the bottom portion 22D is a region surrounded by an opening 26B that is described below. In FIG. 6, an outline of the second main surface 22C is represented by a dotted line.

Figure 4:
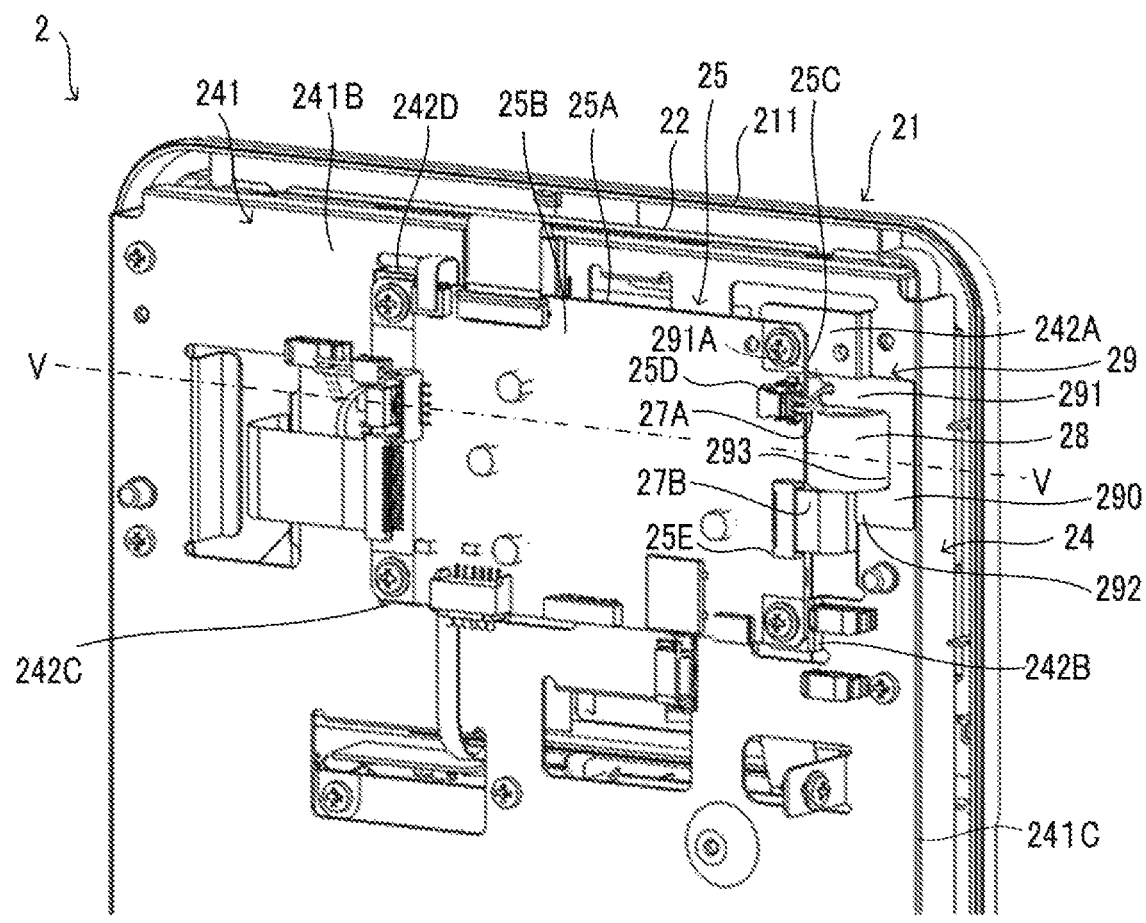
FIG. 4 is a perspective diagram showing a main part in the operation/display portion in FIG. 1.
Figure 4:
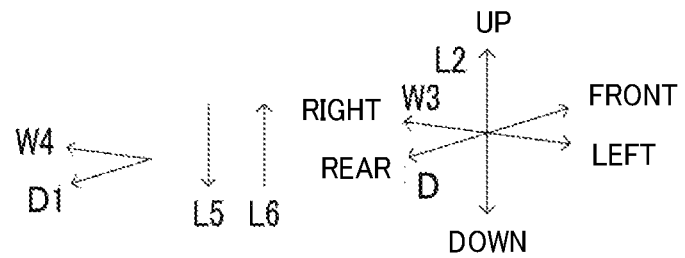

As shown in FIG. 4, the frame portion 24 is manufactured by sheet metal working of a metal plate. The frame portion 24 is attached to the front casing 211 with a plurality of screws. In addition, the frame portion 24 includes a base portion 241 and four attachment portions 242A, 242B, 242C, and 242D.

As shown in FIG. 5, the base portion 241 is formed to be separated in the first direction D1 from the bottom portion 22D of the second main surface 22C. The base portion 241 includes a first main surface 241A and a second main surface 241B. The first main surface 241A and the second main surface 241B are parallel to the second direction L2 and the third direction W3. The first main surface 241A is separated from the second main surface 22C by a distance FD1 that is larger than a half of an outer diameter φ01 (see FIG. 9) of the filter 28. It is noted that the distance FD1 is an example of a sixth specific distance of the present disclosure. Thus, hereinafter, the distance FD1 is referred to as a sixth specific distance FD1. The second main surface 241B is separated in a reverse direction to the first direction D1 from the second main surface 22C by a distance that corresponds to a thickness T01 of the plate (namely, the thickness of the base portion 241).

As shown in FIG. 6, an outer shape of the second main surface 241B is approximately rectangular in a plan view seen from the rear of the operation/display portion 2. In both the second direction L2 and the third direction W3, the second main surface 241B is (1) smaller in size than the front casing 211 and (2) larger than the second main surface 22C of the display portion 22. It is noted that in FIG. 6, an outline of the display portion 22, the second main surface 22C is represented by a dotted line.

The second main surface 241B has an outer periphery 241C at its left end. The outer periphery 241C extends in the second direction L2.

As shown in FIG. 5, a cut opening 241G is formed in the base portion 241, wherein the cut opening 241G penetrates through the base portion 241 from the first main surface 241A to the second main surface 241B in the first direction D1. Specifically, as shown in FIG. 6, the cut opening 241G is formed at an upper left corner of the second main surface 241B. The size of the cut opening 241G in the third direction W3 (namely, the width) is W01, and the size of the cut opening 241G in the second direction L2 (namely, the length) is L01.

In FIG. 6, the cut opening 241G is surrounded by an inner peripheral surface 241H formed in the base portion 241. In other words, the shape of the cut opening 241G is defined by the inner peripheral surface 241H. Specifically, the inner peripheral surface 241H of the base portion 241 has a plurality of end surfaces that connect sides of the first main surface 241A with sides of the second main surface 241B that form boundaries from the cut opening 241G.

Specifically, the plurality of end surfaces include four end surfaces 241J, 241K, 241L, and 241M on the left side of the inner peripheral surface 241H. The end surface 241J is an example of a first end surface of the present disclosure. The end surface 241K is an example of a second end surface of the present disclosure. The end surface 241L is an example of a third end surface of the present disclosure. Accordingly, hereinafter, the end surface 241J may be referred to as a first end surface 241J, the end surface 241K may be referred to as a second end surface 241K, and the end surface 241L may be referred to as a third end surface 241L. As a result, the base portion 241 has the first end surface 241J, the second end surface 241K, and the third end surface 241L that are included in the inner peripheral surface 241H.

In the base portion 241, the first end surface 241J and the end surface 241M are located close to the outer periphery 241C, and extend in the second direction L2.

In FIG. 6, the first end surface 241J includes end portions FP1 and SP2 (see inside a frame FL1). The end portions FP1 and SP2 are separated from each other by a first specific distance SD2 that is larger than a distance TD3 (see FIG. 9). In addition, the distance TD3 corresponds to a size of the filter 28 in a length direction L8. The first end surface 241J extends in the second direction L2 from the end portion FP1 to the end portion SP2, and defines a shape of the opening 26B at one end thereof in the third direction W3.

It is noted that the end portion FP1 is an upper end portion of the first end surface 241J, and the end portion SP2 is a lower end portion thereof. In addition, the end portion FP1 is an example of a first end portion of the present disclosure, and the end portion SP2 is an example of a second end portion of the present disclosure. Thus hereinafter, the end portion FP1 may be referred to as a first end portion FP1, and the end portion SP2 may be referred to as a second end portion SP2.

In FIG. 6, the end surface 241M is separated rightward from the first end surface 241J by a distance smaller than a distance SD6. The distance SD6 is a distance in the fourth direction W4 between an end surface 25C (described below) of the substrate 25 and the first end surface 241J. An end portion FP4 (see inside the frame FL1) that is an upper end portion of the end surface 241M, is at the same position as the end portion SP2 of the first end surface 241J in the second direction L2. The end surface 241M extends in the second direction L2 from the end portion FP4 by a predetermined distance.

In the base portion 241, the second end surface 241K and the third end surface 241L are located close to the outer periphery 241C, and extend in the third direction W3. The second end surface 241K connects to the first end portion FP1 of the first end surface 241J at one end thereof in the third direction W3. That is, the second end surface 241K and the first end surface 241J share the first end portion FP1. The second end surface 241K further includes an end portion TP3 that is separated in the fourth direction W4 from the first end portion FP1. The second end surface 241K extends in the third direction W3 from the first end portion FP1 to the end portion TP3, defining the shape of an end portion of the opening 26B at one end thereof in the second direction L2. It is noted that the distance between the end portions TP3 and FP1 is predefined. The end portion TP3 is an example of a third end portion of the present disclosure. Thus hereinafter, the end portion TP3 may be referred to as a third end portion TP3.

The third end surface 241L connects to the second end portion SP2 of the first end surface 241J at one end thereof in the third direction W3. That is, the third end surface 241L and the first end surface 241J share the second end portion SP2. The third end surface 241L further includes an end portion FP4 that is separated in the fourth direction W4 from the second end portion SP2. In other words, the third end surface 241L and the end surface 241M share the end portion FP4. The third end surface 241L extends in the third direction W3 from the second end portion SP2 to the end portion FP4, and connects to an upper end portion (namely, the end portion FP4) of the end surface 241M. The third end surface 241L defines a shape of the opening 26B at the other end thereof in the second direction L2. It is noted that the distance between the end portions SP2 and FP4 is predefined, and smaller than the distance SD6. In FIG. 6, the substrate 25 is represented by a dotted line. It is noted that the end portion FP4 is an example of a fourth end portion of the present disclosure. Thus hereinafter the end portion FP4 may be referred to as a fourth end portion FP4.

In FIG. 4, the attachment portions 242A to 242D are integrally formed with the base portion 241 around the cut opening 241G by bending the metal plate. The attachment portions 242A to 242D protrude in the first direction D1 (namely, rearward) from the second main surface 241B.

The attachment portion 242A is an example of an attachment portion of the present disclosure. The attachment portion 242A is located close to the outer periphery 241C on the second main surface 241B (see inside a frame FL2 in FIG. 5) and close to the upper left corner of the cut opening 241G (see FIG. 6). From that position, the attachment portion 242A extends in the first direction D1 by a predetermined distance EDB, and is bent to extend in the fourth direction W4 by a predetermined distance ND9 (see inside the frame FL2 in FIG. 5).

More specifically, the attachment portion 242A includes, at its lower end, an end surface 242E. The end surface 242E is an example of a fourth end surface of the present disclosure. Thus hereinafter, the end surface 242E may be referred to as a fourth end surface 242E.

The fourth end surface 242E connects to the third end portion TP3 of the second end surface 241K at the other end thereof in the first direction D1. That is, the fourth end surface 242E and the second end surface 241K share the third end portion TP3. The fourth end surface 242E further includes an end portion FP5 and an intermediate portion SP6. It is noted that the end portion FP5 is an example of a fifth end portion of the present disclosure. Thus hereinafter, the end portion FP5 may be referred to as a fifth end portion FP5.

The fifth end portion FP5 is separated from the third end portion TP3 in both the first direction D1 and the fourth direction W4 (namely, diagonally rearward left). Specifically, the fifth end portion FP5 is separated from the third end portion TP3 in the first direction D1 by a distance that is obtained by subtracting a distance corresponding to the thickness T01 from the distance ED8. The fifth end portion FP5 is separated in the fourth direction W4 from the third end portion TP3 by the distance ND9.

The intermediate portion SP6 is separated in the first direction D1 from the third end portion TP3 by the distance ED8.

The fourth end surface 242E extends from the third end portion TP3 to the fifth end portion FP5 via the intermediate portion SP6. Specifically, the fourth end surface 242E extends in the first direction D1 from the third end portion TP3 to the intermediate portion SP6, and extends in the fourth direction W4 from the intermediate portion SP6 to the fifth end portion FP5. The fourth end surface 242E defines a shape of the opening 26B at one end thereof in the second direction L2 (namely, in the sixth direction L6).

The fourth end surface 242E is made flush with the end surface 241K. That is, there is no level difference between the fourth end surface 242E and the end surface 241K, and they are flat with each other. It is noted that the fourth end surface 242E may not be made flush with the end surface 241K.

In FIG. 6, the attachment portion 242B is, in the second main surface 241B, separated from the attachment portion 242A in the fifth direction L5, and is provided close to the lower left corner of the cut opening 241G. From that position, the attachment portion 242B extends in the first direction D1 by the distance ED8 (see FIG. 5), and is bent to extend in the fourth direction W4.

The attachment portion 242C is, in the second main surface 241B, separated rightward from the attachment portion 242B, and is provided close to the lower right corner of the cut opening 241G. From that position, the attachment portion 242C extends in the first direction D1 by the distance ED8 (see FIG. 5), and is bent to extend in a reverse direction to the fourth direction W4.

The attachment portion 242D is, in the second main surface 241B, separated rightward from the attachment portion 242A, and is provided close to the upper right corner of the cut opening 241G. From that position, the attachment portion 242D extends in the first direction D1 by the distance ED8 (see FIG. 5), and is bent to extend in the reverse direction to the fourth direction W4.

The substrate 25 is what is called a print board formed from glass epoxy resin or the like. As shown in FIG. 4, the substrate 25 is attached to the attachment portions 242A to 242D with screws or the like.

Figure 7:
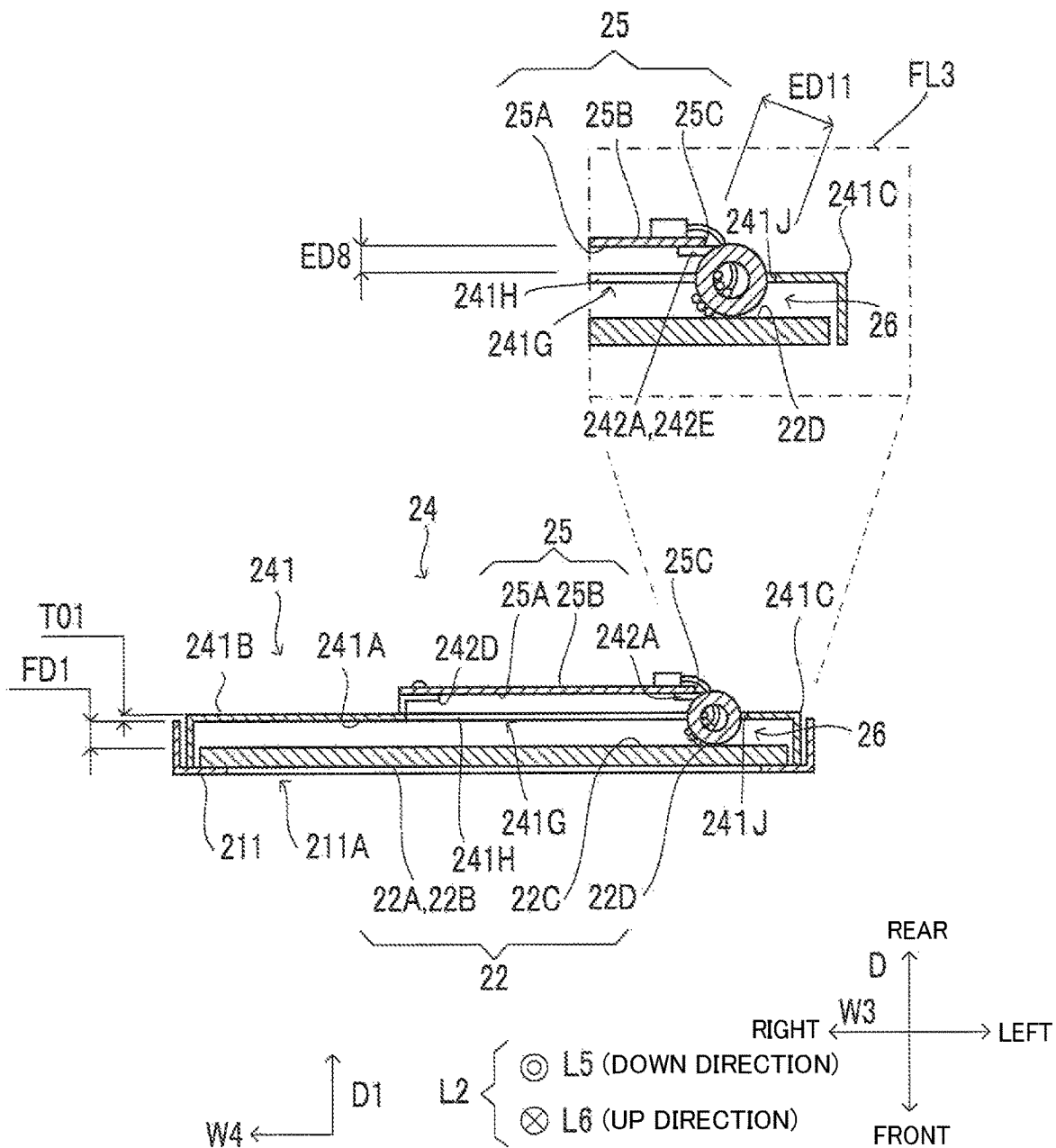
FIG. 7 is a schematic cross-sectional diagram of the operation/display portion taken along the one-dot chain line V-V in FIG. 4 viewed from below, showing the operation/display portion after the substrate is attached thereto.

As shown in FIG. 7, the substrate 25 includes a first main surface 25A and a second main surface 25B that are separated from each other in the front-rear direction D. In FIG. 7, the front surface of the substrate 25 is the first main surface 25A, and the rear surface of the substrate 25 is the second main surface 25B. The first main surface 25A is separated in the first direction D1 from the bottom portion 22D. In addition, the first main surface 25A is separated in the first direction D1 from the second main surface 241B of the base portion 241 by the distance ED8. The second main surface 25B is separated in the first direction D1 from the first main surface 25A by a distance corresponding to the thickness of the substrate 25.

The first main surface 25A and the second main surface 25B are rectangular and of the same size. It is noted that chamfering may be performed on the first main surface 25A and the second main surface 25B. When the size of the first main surface 25A and the second main surface 25B in the third direction W3 is defined as W02 (hereinafter the size is referred to as a width), the width W02 is narrower than the width W01 (see FIG. 8). In addition, when the size of the first main surface 25A and the second main surface 25B in the second direction L2 is defined as L02 (hereinafter the size is referred to as a length), the length L02 is smaller than the length L01 (see FIG. 8).

Figure 8:
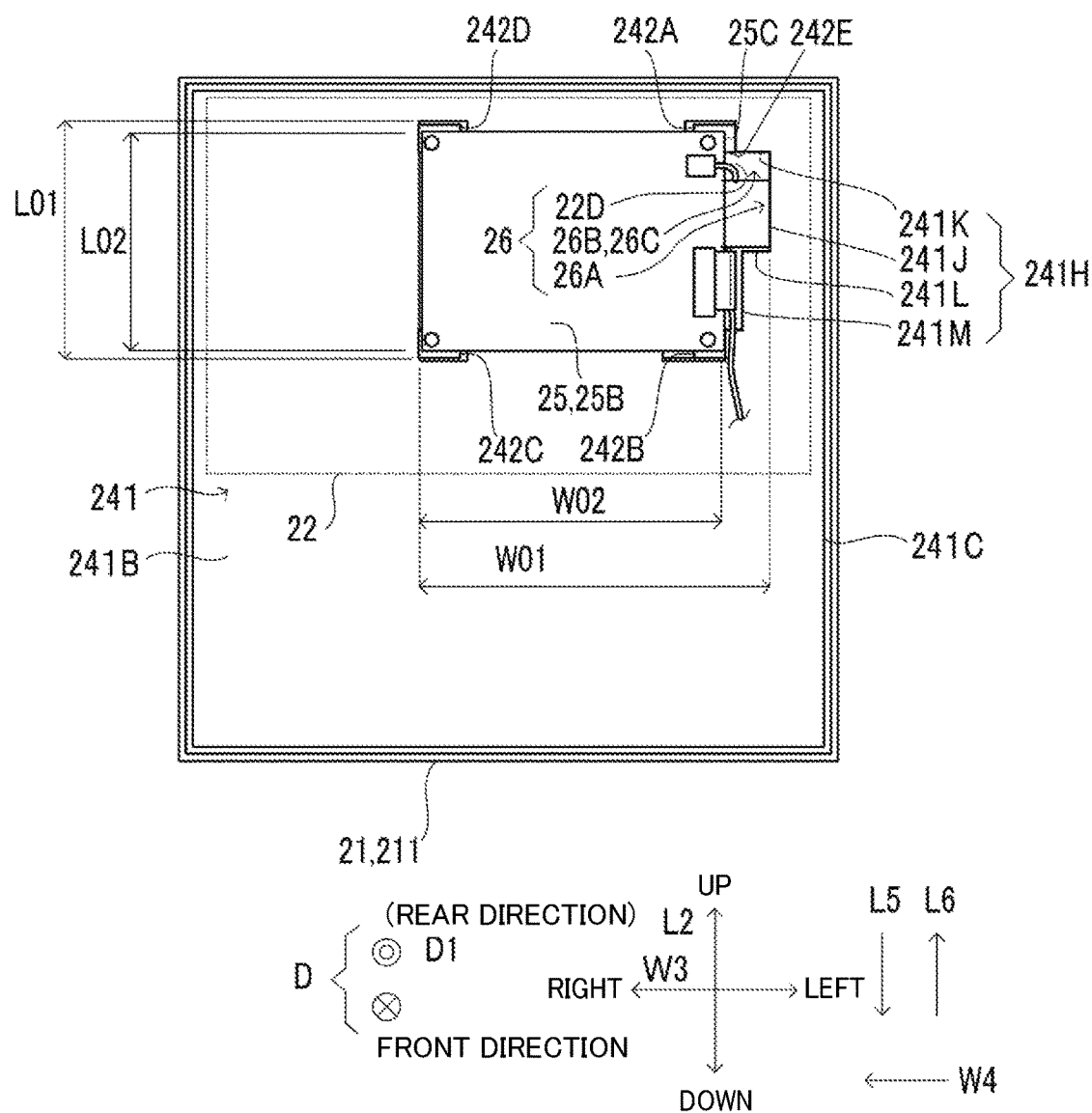
FIG. 8 is a schematic diagram of the frame portion in FIG. 4 viewed from rear, showing the operation/display portion after the substrate is attached thereto.

The substrate 25 further includes four end surfaces that connect the first main surface 25A with the second main surface 25B. As indicated in a frame FL3 in FIG. 7, in a state where the substrate 25 is attached to the attachment portions 242A to 242D (see FIG. 4), the substrate 25 has the end surface 25C at its left end. The end surface 25C is an example of a fifth end surface of the present disclosure. Thus hereinafter, the end surface 25C may be referred to as a fifth end surface 25C. In the state where the substrate 25 is attached to the attachment portions 242A to 242D (see FIG. 4), the fifth end surface 25C is separated in the fourth direction W4 from the first end surface 241J. As shown in the frame FL3 in FIG. 7, the fifth end surface 25C abuts on an end portion of the fourth end surface 242E at an end thereof in the first direction D1. As shown in FIG. 8, the fifth end surface 25C extends in the fifth direction L5 that is directed from one side of the second direction L2 to the other side, and reaches the attachment portion 242B.

As shown in FIG. 9, the storage portion 26 includes the bottom portion 22D and an inner peripheral portion 26A that defines the shape of the opening 26B at a position separated from the bottom portion 22D in the first direction D1. The inner peripheral portion 26A includes the first end surface 241J, the second end surface 241K, the third end surface 241L, the fourth end surface 242E, and the fifth end surface 25C. Specifically, the inner peripheral portion 26A includes a bent surface and the fifth end surface 25C that intersects the bent surface, wherein the bent surface is obtained by continuously connecting the end surfaces 241L, 241J, 241K, and 242E in the order. The opening 26B is a space surrounded by the inner peripheral portion 26A, namely, the first end surface 241J, the second end surface 241K, the third end surface 241L, the fourth end surface 242E, and the fifth end surface 25C. More specifically, the opening 26B is a space surrounded by end portions of the inner peripheral portion 26A at an end thereof in the first direction D1. As shown in FIG. 5, a storage space 26C is formed in the storage portion 26 by the bottom portion 22D and the inner peripheral portion 26A, wherein the storage space 26C extends from the bottom portion 22D to the opening 26B. In FIG. 5, the storage space 26C is a portion surrounded by a dotted line, and the storage portion 26 is adjacent on the left of the substrate 25 in a plan diagram viewed from the rear of the operation/display portion 2. With this configuration, compared with a case where the whole inner peripheral portion 26A is formed in the base portion 241, it is possible to reduce a space occupied by the substrate 25 and the storage portion 26 in the housing 21. As a result, it is possible to miniaturize the operation/display portion 2.

Figure 10:
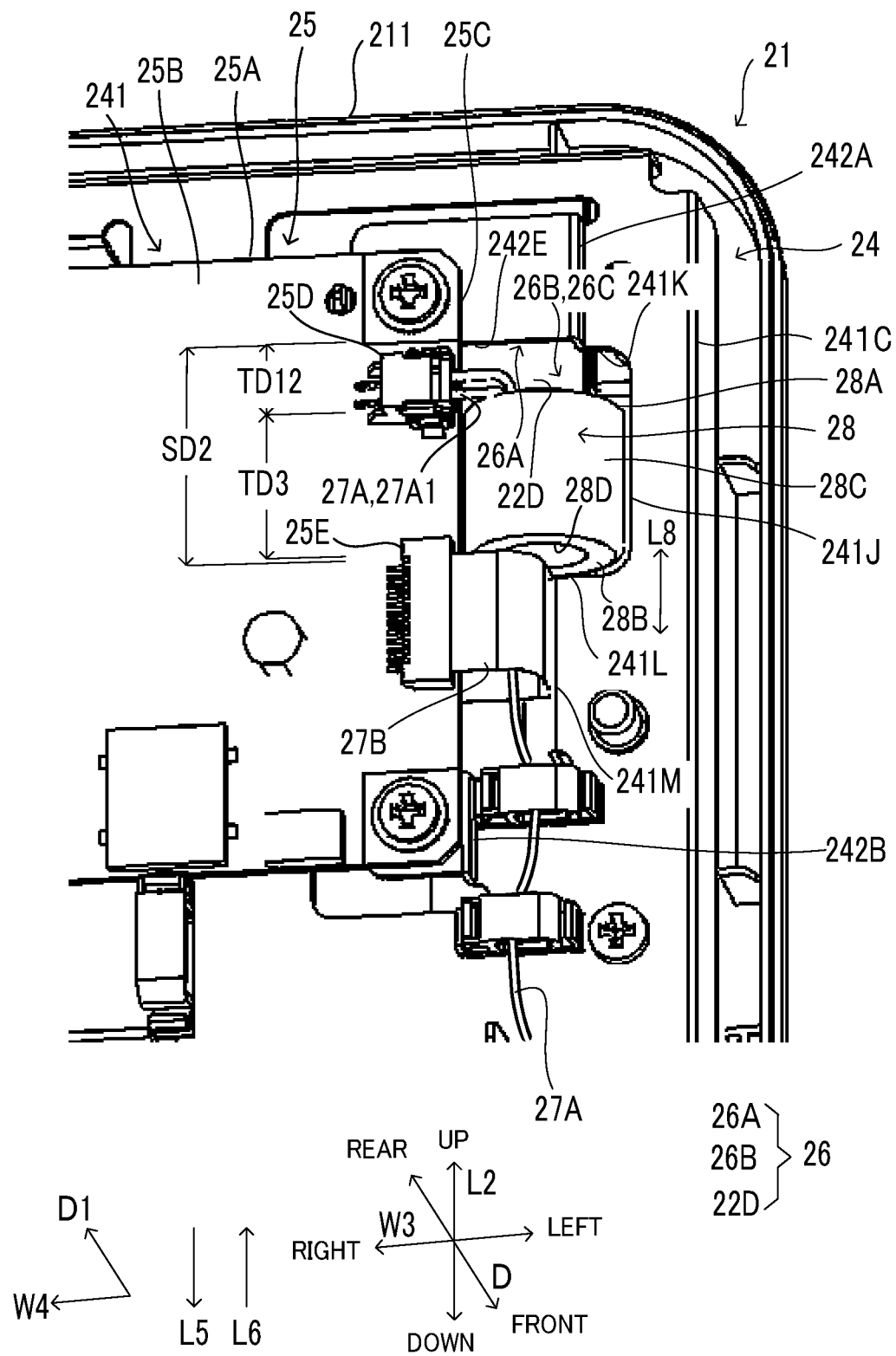
FIG. 10 is an enlargement diagram of the storage portion in FIG. 6 viewed from diagonally rear, showing the operation/display portion after the filter is attached thereto.

As shown in FIG. 10, the filter 28 with the first wire 27A inserted in a through hole 28D of the filter 28, and a specific portion of the first wire 27A that extends from a base end portion 27A1 to the filter 28, are stored in the storage space 26C of the storage portion 26. It is noted that the first wire 27A and the filter 28 are described in detail below.

As shown in FIG. 9, an electronic circuit is provided on the second main surface 25B of the substrate 25, wherein the electronic circuit transmits image data based on which an image is displayed on the display portion 22. The display portion 22 displays the image based on the image data. Specifically, the electronic circuit includes a semiconductor integrated circuit including a processor or the like, various types of electronic parts, and wires that connect these members. The various types of electronic parts include: an element such as a capacitor; and two connectors 25D and 25E. The connector 25D is provided on the second main surface 25B at a position close to its upper left corner. The connector 25E is provided on the second main surface 25B at a position separated from the connector 25D in the fifth direction L5 by a distance larger than the distance TD3.

The filter 28 is, for example, a cylindrical ferrite, and includes end surfaces 28A and 28B, and an outer peripheral surface 28C.

The end surfaces 28A and 28B have a same annular shape. The end surfaces 28A and 28B are separated from each other in the length direction L8 by a predetermined distance TD3. That is, the filter 28 has a size (namely, a length) in the length direction L8 that corresponds to the distance TD3. In addition, the end surfaces 28A and 28B have a predetermined outer diameter φ01. The outer diameter φ01 is smaller than a straight distance ED11 between the end surfaces 25C and 241J (see FIG. 7). This allows the filter 28 to be inserted in the opening 26B of the storage portion 26.

The outer peripheral surface 28C connects outer peripheries of the end surfaces 28A and 28B.

The filter 28 has the through hole 28D that penetrates the filter 28 in the length direction L8 from the end surface 28A to the end surface 28B. The first wire 27A is inserted in the through hole 28D and wound around the filter 28.

As shown in FIG. 9, in a state where the length direction L8 matches the second direction L2, the filter 28 with the first wire 27A inserted in the through hole 28D is inserted in the storage portion 26 from the opening 26B, and is stored in the storage portion 26. In this case, the filter 28 is surrounded by the end surfaces 241J, 241K, 241L, 242E, and 25C. In addition, the filter 28 is stored in the storage portion 26 such that the end surface 28A is separated from the second end surface 241K and the fourth end surface 242E of the storage portion 26 in the fifth direction L5 by a second specific distance TD12. The second specific distance TD12 is smaller than a distance that is obtained by subtracting the distance TD3 from the first specific distance SD2.

The first wire 27A includes a base end portion 27A1 at one end thereof. The base end portion 27A1 is electrically connected with the connector 25D, and is electrically connected with the electronic circuit via the connector 25D. When the filter 28 is stored in the storage portion 26, the first wire 27A extends from the connector 25D into the storage portion 26 by passing the fifth end surface 25C. The first wire 27A passes through the storage portion 26 and reaches the filter 28. In other words, a specific portion of the first wire 27A that extends from the base end portion 27A1 to the filter 28 is also stored in the storage portion 26. Specifically, the specific portion is stored in a portion of the storage portion 26 between the filter 28 and the fourth end surface 242E. The other end of the first wire 27A is electrically connected with a control portion (not shown) or a power supply circuit (not shown) provided inside the housing 1 (see FIG. 1). When the image forming apparatus 100 is operating, the filter 28 removes unnecessary high-frequency components from a signal or AC power that is transmitted through the first wire 27A.

The second wire 27B is, for example, a flat cable for transmitting the signal or the like, and is electrically connected with the electronic circuit via the connector 25E. The second wire 27B extends from the connector 25E toward the end surface 241M by passing the fifth end surface 25C. The second wire 27B is bent at a position between the fifth end surface 25C and the end surface 241M, and extends frontward of the substrate 25.

From the viewpoint of mounting the various types of electronic parts in high density on the substrate 25, the connector 25E is disposed as close to the connector 25D as possible. Specifically, the upper-end portion of the second wire 27B is disposed close to the third end surface 241L in the sixth direction L6 that is directed from the other side to one side of the second direction L2. In this case, the upper-end portion of the second wire 27B may protrude from the third end surface 241L in the sixth direction L6.

In general, members such as a frame manufactured by sheet metal working, an exterior body, and a rigid substrate are provided in an electric device. The peripheral portions of the members may be sharp edges. As a result, in a case where a filter with a wire inserted therein is provided inside the electric device, the filter may move inside the electric device and the wire inserted in the filter may be damaged by contacting the edges.

The present embodiment provides an electric device and a display device that realize, with a simple member, a configuration for positioning the filter and restricting the wire inserted in the filter from being damaged.

Figure 11:
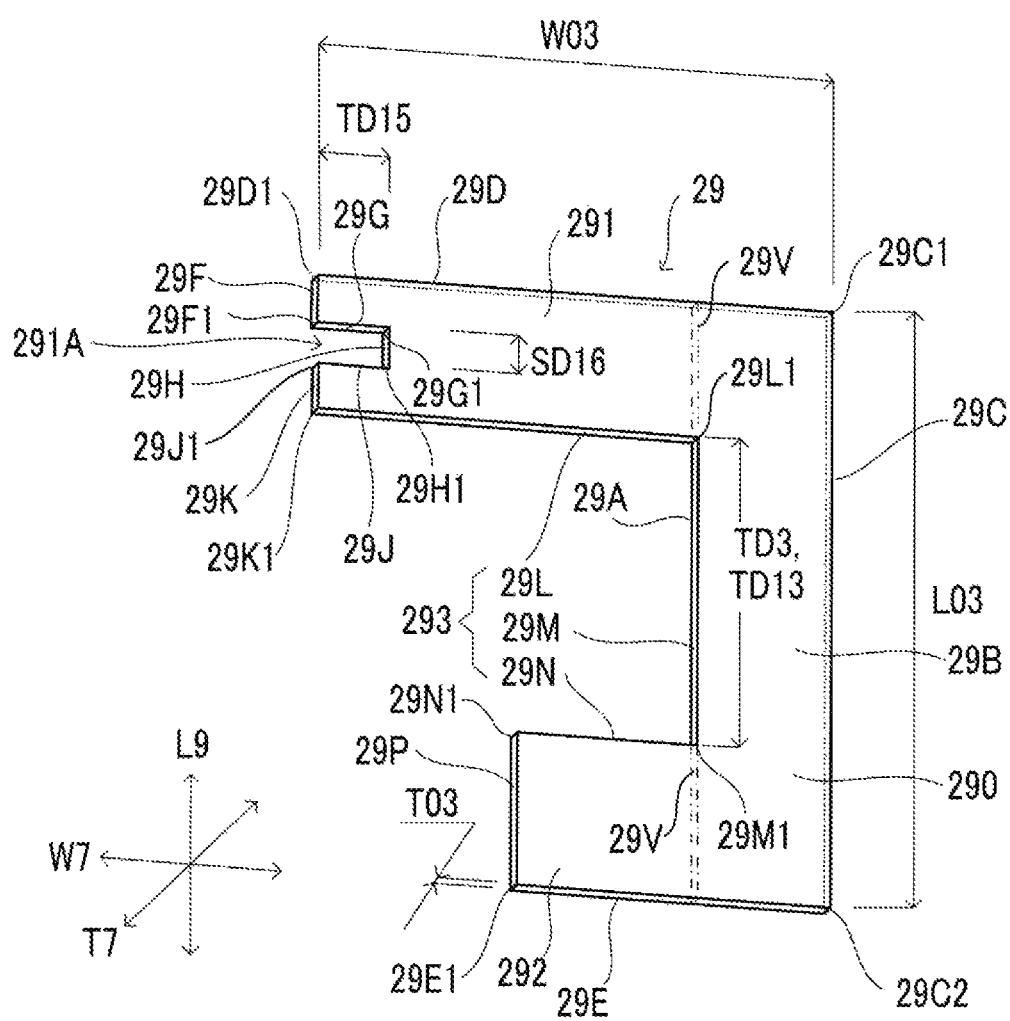
FIG. 11 is a perspective diagram of a holding member.

The holding member 29 is formed from a flexible material. Specifically, the holding member 29 is manufactured by processing the flexible material. The flexible material is resin such as polycarbonate. As shown in FIG. 11, the holding member 29 has a sheet-like shape. By using a thin holding member 29, it is possible to manufacture the holding member 29 at low cost. As shown in FIG. 4, in the state where the filter 28 and the first wire 27A are stored in the storage portion 26, the holding member 29 is attached to the periphery of the opening 26B of the storage portion 26 (see FIG. 9) on the second main surface 241B of the base portion 241 by adhesive or the like. Specifically, the holding member 29 is attached to the storage portion 26 so as to protrude from the inner peripheral portion 26A of the storage portion 26 toward the opening 26B.

Figure 12:
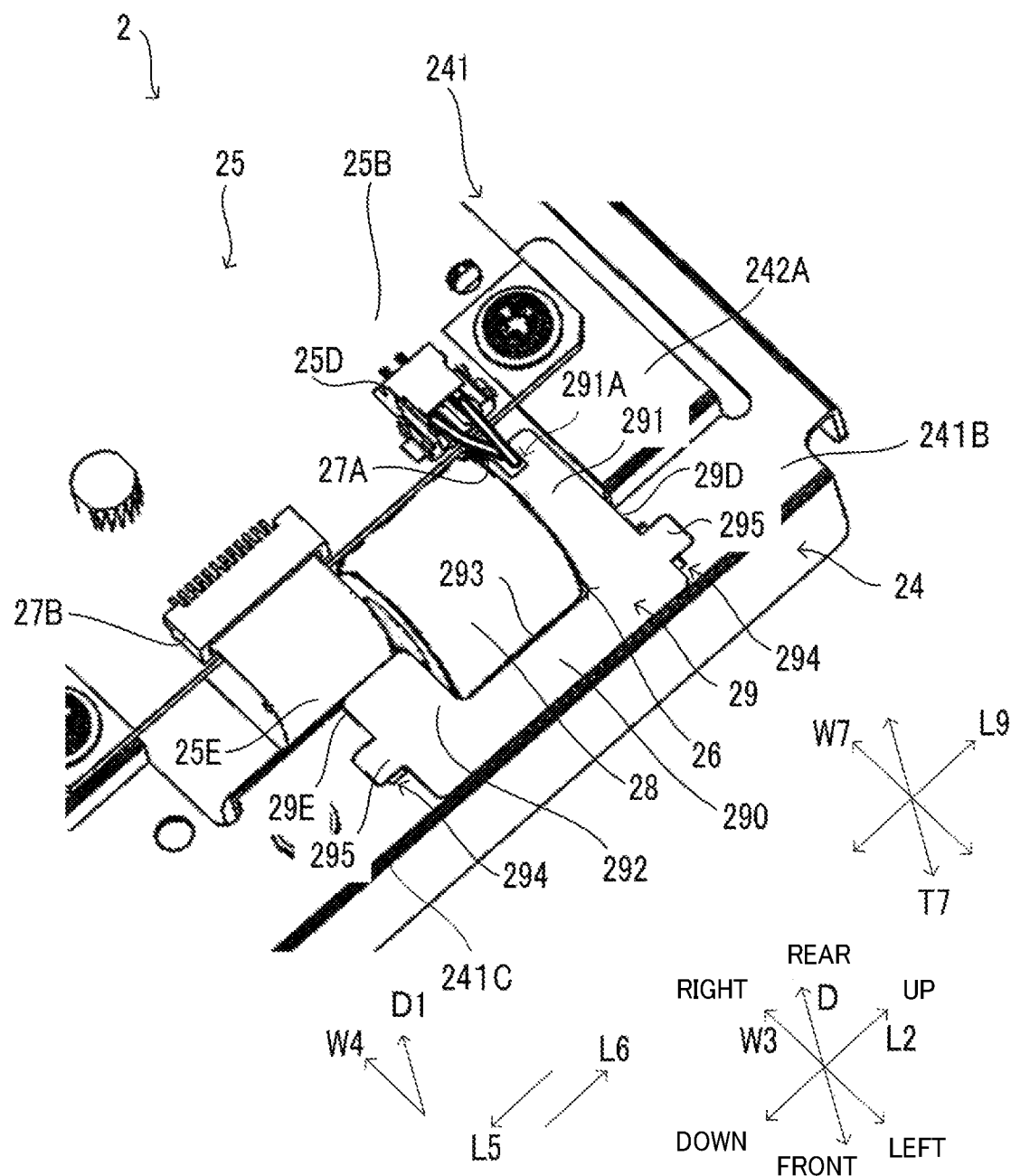
FIG. 12 is a perspective diagram showing another example of a method of attaching the holding member in FIG. 11 to a base portion.

It is noted that the holding member 29 may be attached to the base portion 241 by a method other than the adhesive. For example, as shown in FIG. 12, through holes 294 may be formed in the second main surface 241B of the base portion 241 at two positions in the periphery of the opening 26B of the storage portion 26. The holding member 29 may further include two insertion portions 295 that respectively protrude from peripheral portions 29D and 29E in a longitudinal direction L9 and are bent in a thickness direction T7. The insertion portions 295 may be inserted in the corresponding through holes 294 so that the holding member 29 is attached to the base portion 241.

As shown in FIG. 11, the holding member 29 has predetermined sizes in the longitudinal direction L9, a width direction W7, and the thickness direction T7. It is noted that the longitudinal direction L9, the width direction W7, and the thickness direction T7 are perpendicular to each other.

The holding member 29 includes a first main surface 29A and a second main surface 29B of the same shape. In FIG. 11, a surface on the depth side (the depth side in the plane of FIG. 11) of the holding member 29 is the first main surface 29A, and a surface on the front side (the front side in the plane of FIG. 11) of the holding member 29 is the second main surface 29B. The first main surface 29A and the second main surface 29B are parallel to each other, and are separated from each other by a distance that corresponds to a thickness T03 in the thickness direction T7.

As shown in FIG. 11, the holding member 29 includes a base portion 290, an interposed portion 291, and an extension portion 292. The base portion 290 extends in the longitudinal direction L9. The interposed portion 291 extends in the width direction W7 from one end of the base portion 290 in the longitudinal direction L9. The extension portion 292 extends in a width direction W9 (in the same direction as the interposed portion 291) from the other end of the base portion 290 in the longitudinal direction L9. The base portion 290, the interposed portion 291, and the extension portion 292 of the holding member 29 are integrally formed.

The length of the holding member 29, namely, a size L03 of the base portion 290 in the longitudinal direction L9 is larger than the first specific distance SD2 (see FIG. 6). In addition, the width of the holding member 29, namely a size W03 of the interposed portion 291 in the width direction W7 is larger than the distance SD6 (see FIG. 6). In addition, the length of the interposed portion 291 in the width direction W7 is larger than the length of the extension portion 292 in the same direction. In addition, the thickness of the holding member 29, namely, the size T03 of the holding member 29 in the thickness direction T7 is equal to or larger than 0.2 mm and equal to or smaller than 0.5 mm. However, not limited to this, the thickness T03 may be equal to or larger than 0.5 mm.

Figure 13:
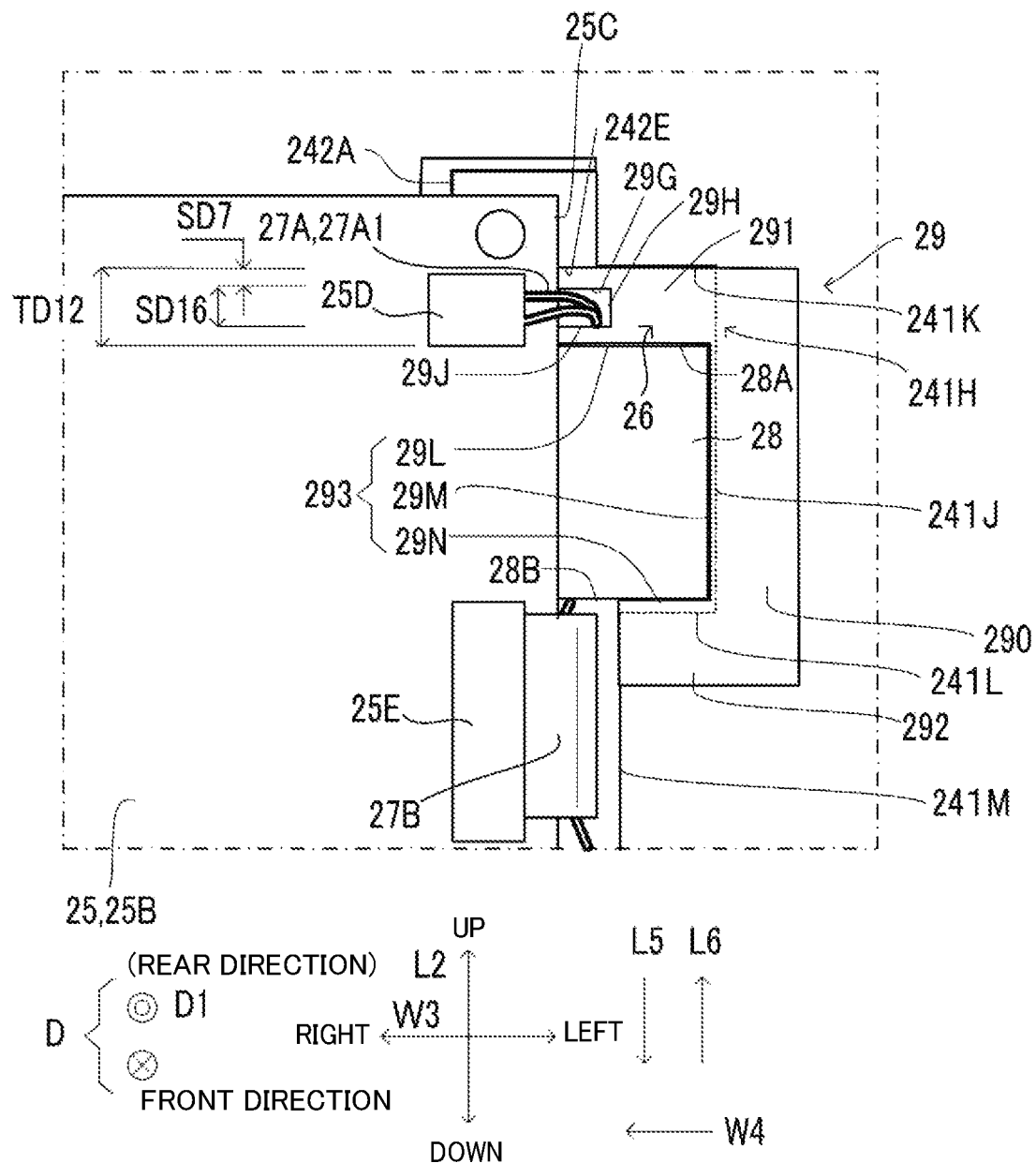
FIG. 13 is a perspective diagram showing a relationship between an interposed portion of the holding member in FIG. 11 and the storage portion.

As shown in FIG. 13, the holding member 29 is arranged on the second main surface 241B as follows. Specifically, in a state where the longitudinal direction L9 matches the second direction L2, the base portion 290 is attached in such a way as to cover the first end surface 241J of the base portion 241. Furthermore, a specific portion of the base portion 290 close to the right end thereof protrudes in the fourth direction W4 from the first end surface 241J and abuts on the left side of the outer peripheral surface 28C of the filter 28, and causes the right side of the outer peripheral surface 28C to abut on the fifth end surface 25C. With this configuration, among the positions of the filter 28 in the storage portion 26, positions in the third direction W3 are regulated. In addition, a portion of the base portion 290 other than the specific portion is attached to the left side of the opening 26B on the second main surface 241B by the adhesive or the like.

When the base portion 290 is attached to the second main surface 241B, a side of the base portion 290 in which the interposed portion 291 is provided (namely, a side of the base portion 290 at one end thereof) is located above the extension portion 292, on the second main surface 241B. The interposed portion 291 extends along the second end surface 241K and the fourth end surface 242E from the first end surface 241J of the base portion 290 toward the fifth end surface 25C of the substrate 25. Specifically, at the opening 26B, the interposed portion 291 is disposed in a space formed between the end surfaces 241K and 242E included in the inner peripheral surface 241H and the end surface 28A of the filter 28. In addition, the extension portion 292 is attached so as to cover the third end surface 241L and the end surface 241M of the base portion 241. Furthermore, a specific portion of the extension portion 292 close to its upper end protrudes in the sixth direction L6 from the third end surface 241L. In addition, the right end portion of the extension portion 292 extends along the end surface 241M. In the extension portion 292, a portion other than the specific portion is attached to the second main surface 241B at a portion below the opening 26B by the adhesive or the like.

A cut portion 291A is provided at a tip of the interposed portion 291 in the width direction W7. When the holding member 29 is attached to the storage portion 26, the cut portion 291A is located at a tip of the interposed portion 291 in the fourth direction W4. The cut portion 291A of the interposed portion 291 is disposed close to the fifth end surface 25C in the space formed between the end surfaces 241K and 242E and the end surface 28A. The specific portion of the first wire 27A is disposed at the cut portion 291A. In other words, the specific portion is fitted in the cut portion 291A. This allows the interposed portion 291 to be interposed between the inner peripheral portion 26A and the specific portion of the first wire 27A.

The lower end portion of the interposed portion 291 abuts on the end surface 28A of the filter 28, and the upper end portion of the extension portion 292 abuts on the end surface 28B of the filter 28. This regulates, among the positions of the filter 28 in the storage portion 26, positions in the up-down direction L2. In addition, positions of the filter 28 in the left-right direction W3 are regulated by the specific portion of the base portion 290. Accordingly, the lower end portion of the interposed portion 291, the upper end portion of the extension portion 292, and the specific portion of the base portion 290 configure a position regulating portion 293 that regulates the position of the filter 28 in the storage portion 26.

As shown in FIG. 11, the holding member 29 includes nine peripheral portions. More specifically, the holding member 29 includes peripheral portions 29C, 29D, 29E, 29F, 29G, 29H, 29J, 29K, and 29P. In addition, the holding member 29 includes three abutting portions. More specifically, the holding member 29 includes abutting portions 29L, 29M, and 29N. The nine peripheral portions and the three abutting portions are end portions that connect the peripheries of the first main surface 29A and the second main surface 29B in the thickness direction T7. In other words, the nine peripheral portions and the three abutting portions are end portions of the holding member 29 in the surface direction.

It is noted that the peripheral portion 29G is an example of a first peripheral portion of the present disclosure. The peripheral portion 29H is an example of a second peripheral portion of the present disclosure. The peripheral portion 29J is an example of a third peripheral portion of the present disclosure. Thus hereinafter, the peripheral portion 29G may be referred to as a first peripheral portion 29G, the peripheral portion 29H may be referred to as a second peripheral portion 29H, and the peripheral portion 29J may be referred to as a third peripheral portion 29J.

The abutting portion 29M is an example of a first abutting portion of the present disclosure. The abutting portion 29L is an example of a second abutting portion of the present disclosure. The abutting portion 29N is an example of a third abutting portion of the present disclosure. Thus hereinafter, the abutting portion 29M may be referred to as a first abutting portion 29M, the abutting portion 29L may be referred to as a second abutting portion 29L, and the abutting portion 29N may be referred to as a third abutting portion 29N.

For the sake of explanation, FIG. 11 shows imaginary surfaces 29V (indicated by one-dot chain lines) that are obtained when the first abutting portion 29M is extended toward two sides of the longitudinal direction L9 until it reaches the peripheral portions 29D and 29E.

In the holding member 29, the base portion 290 is surrounded by the peripheral portions 29C, 29D, and 29E and the imaginary surfaces 29V. The interposed portion 291 includes the peripheral portions 29D, 29F, 29G, 29H, 29J, and 29K and the abutting portion 29L. Specifically, in the holding member 29, the interposed portion 291 is surrounded by: a portion of the imaginary surfaces 29V that is more on the peripheral portion 29D side than the first abutting portion 29M; the peripheral portions 29D, 29F, 29G, 29H, 29J, and 29K; and the second abutting portion 29L. In the interposed portion 291, the cut portion 291A includes the first peripheral portion 29G, the second peripheral portion 29H, and the third peripheral portion 29J. In the holding member 29, the extension portion 292 is surrounded by the third abutting portion 29N, the peripheral portions 29P and 29E, and the imaginary surfaces 29V. In addition, the position regulating portion 293 includes the first abutting portion 29M, the second abutting portion 29L, and the third abutting portion 29N.

The peripheral portion 29C is a periphery of the base portion 290 at one end thereof in the width direction W7. The peripheral portion 29C includes a corner portion 29C1 at one end thereof in the longitudinal direction L9, and a corner portion 29C2 at the other end. The corner portion 29C1 and the corner portion 29C2 are separated from each other by a distance corresponding to the length L03 in the longitudinal direction L9. The peripheral portion 29C extends in the longitudinal direction L9 between the corner portion 29C1 and the corner portion 29C2.

The peripheral portion 29D is composed of peripheries of the base portion 290 and the interposed portion 291 at one end thereof in the longitudinal direction L9. Specifically, the peripheral portion 29D connects to the corner portion 29C1 of the peripheral portion 29C at one end thereof in the width direction W7. That is, the peripheral portion 29D and the peripheral portion 29C share the corner portion 29C1. The peripheral portion 29D further includes a corner portion 29D1 at the other end thereof separated from the corner portion 29C1 in the width direction W7 by a distance equal to the width W03. The peripheral portion 29D extends in the width direction W7 between the corner portion 29C1 and the corner portion 29D1.

The peripheral portion 29E is composed of peripheries of the base portion 290 and the extension portion 292 at the other end thereof in the longitudinal direction L9. Specifically, the peripheral portion 29E connects to the corner portion 29C2 of the peripheral portion 29C at one end thereof in the width direction W7. That is, the peripheral portion 29E and the peripheral portion 29C share the corner portion 29C2. The peripheral portion 29E further includes a corner portion 29E1 at the other end thereof in the width direction W7 separated from the corner portion 29C2 by a distance smaller than the width W03. The peripheral portion 29E extends in the width direction W7 between the corner portion 29C2 and the corner portion 29E1.

The peripheral portion 29F is a periphery of the interposed portion 291 at one end thereof in the width direction W7. Specifically, the peripheral portion 29F connects to the corner portion 29D1 of the peripheral portion 29D at one end thereof in the longitudinal direction L9. That is, the peripheral portion 29F and the peripheral portion 29D share the corner portion 29D1. The peripheral portion 29F further includes a corner portion 29F1 at the other end thereof in the longitudinal direction L9 separated from the corner portion 29D1 by a predetermined distance. The peripheral portion 29F extends in the longitudinal direction L9 between the corner portion 29D1 and the corner portion 29F1.

The first peripheral portion 29G is a periphery of the cut portion 291A at one end thereof in the longitudinal direction L9. Specifically, the first peripheral portion 29G connects to the corner portion 29F1 of the peripheral portion 29F at one end thereof in the width direction W7. That is, the first peripheral portion 29G and the peripheral portion 29F share the corner portion 29F1. The first peripheral portion 29G further includes a corner portion 29G1 at the other end thereof in the width direction W7 separated from the corner portion 29F1 by a distance FD15. The first peripheral portion 29G extends in the width direction W7 between the corner portion 29F1 and the corner portion 29G1.

The second peripheral portion 29H is a periphery of the cut portion 291A at the other end thereof in the width direction W7. Specifically, the second peripheral portion 29H connects to the corner portion 29G1 of the first peripheral portion 29G at one end thereof in the longitudinal direction L9. That is, the second peripheral portion 29H and the first peripheral portion 29G share the corner portion 29G1. The second peripheral portion 29H further includes a corner portion 29H1 at the other end thereof in the longitudinal direction L9 separated from the corner portion 29G1 by a fourth specific distance SD16. The second peripheral portion 29H extends in the longitudinal direction L9 between the corner portion 29G1 and the corner portion 29H1.

The third peripheral portion 29J is a periphery of the cut portion 291A at the other end thereof in the longitudinal direction L9. Specifically, the third peripheral portion 29J connects to the corner portion 29H1 of the peripheral portion 29H at one end thereof in the width direction W7. That is, the third peripheral portion 29J and the second peripheral portion 29H share the corner portion 29H1. The third peripheral portion 29J further includes a corner portion 29J1 at the other end thereof in the width direction W7 separated from the corner portion 29H1 by the fourth specific distance SD16. The third peripheral portion 29J extends in the width direction W7 between the corner portion 29H1 and the corner portion 29J1.

The distance FD15 and the fourth specific distance SD16 are determined based on the thickness of the first wire 27A (see FIG. 11). Specifically, each of the distance FD15 and the fourth specific distance SD16 is larger than the thickness of the first wire 27A. This makes it easy for the first wire 27A to be inserted in a space surrounded by the peripheral portions 29G, 29H, and 29J. It is noted that the distance FD15 and the fourth specific distance SD16 are different distances. However, not limited to this, the distance FD15 and the fourth specific distance SD16 may be the same distance.

The peripheral portion 29K is a periphery of the interposed portion 291 at one end thereof in the width direction W7. Specifically, the peripheral portion 29K connects to the corner portion 29J1 of the third peripheral portion 29J at one end thereof in the longitudinal direction L9. That is, the peripheral portion 29K and the third peripheral portion 29J share the corner portion 29J1. The peripheral portion 29K further includes a corner portion 29K1 at the other end thereof in the longitudinal direction L9 separated from the corner portion 29J1. The corner portion 29J1 and the corner portion 29K1 are separated from each other by a distance equal to the length of the peripheral portion 29F. The peripheral portion 29K extends in the longitudinal direction L9 between the corner portion 29J1 and the corner portion 29K1.

The second abutting portion 29L is a periphery of the interposed portion 291 at the other end thereof in the longitudinal direction L9. Specifically, the second abutting portion 29L connects to the corner portion 29K1 of the peripheral portion 29K at one end thereof in the width direction W7. That is, the second abutting portion 29L and the peripheral portion 29K share the corner portion 29K1. The second abutting portion 29L further includes a corner portion 29L1 at the other end thereof in the width direction W7 separated from the corner portion 29K1. The corner portion 29K1 and the corner portion 29L1 are separated from each other by a distance that is smaller than the distance SD6 and larger than the third abutting portion 29N. The second abutting portion 29L extends in the width direction W7 between the corner portion 29K1 and the corner portion 29L1.

The first abutting portion 29M is a periphery of the base portion 290 at the other end thereof in the width direction W7. Specifically, the first abutting portion 29M connects to the corner portion 29L1 of the second abutting portion 29L at one end thereof in the longitudinal direction L9. That is, the first abutting portion 29M and the second abutting portion 29L share the corner portion 29L1. The first abutting portion 29M further includes a corner portion 29M1 at the other end thereof in the longitudinal direction L9 separated from the corner portion 29L1 by a fifth specific distance TD13 equal to the distance TD3. The first abutting portion 29M extends in the longitudinal direction L9 between the corner portion 29L1 and the corner portion 29M1.

It is noted that the corner portion 29L1 is an example of a sixth end portion of the present disclosure. In addition, the corner portion 29M1 is an example of a seventh end portion of the present disclosure. Thus hereinafter, the corner portion 29L1 may be referred to as a sixth end portion 29L1. In addition, the corner portion 29M1 may be referred to as a seventh end portion 29M1.

The third abutting portion 29N is a periphery of the extension portion 292 at one end thereof in the longitudinal direction L9. Specifically, the third abutting portion 29N connects to the seventh end portion 29M1 of the first abutting portion 29M at the other end in the width direction W7. That is, the third abutting portion 29N and the first abutting portion 29M share the seventh end portion 29M1. The third abutting portion 29N further includes a corner portion 29N1 at the other end thereof in the width direction W7 separated from the seventh end portion 29M1. The seventh end portion 29M1 and the corner portion 29N1 are separated from each other by a distance that is smaller than the outer diameter φ01. The third abutting portion 29N extends in the width direction W7 between the seventh end portion 29M1 and the corner portion 29N1.

The length of the first abutting portion 29M is the same as the length of the filter 28. In addition, the second abutting portion 29L and the third abutting portion 29N protrude in the same direction from the first abutting portion 29M. Accordingly, the filter 28 can be inserted in a space surrounded by the first abutting portion 29M, the second abutting portion 29L, and the third abutting portion 29N. In this case, the first abutting portion 29M abuts on the outer peripheral surface 28C of the filter 28. In addition, the second abutting portion 29L and the third abutting portion 29N respectively abut on the end surfaces 28A and 28B of the filter 28.

The peripheral portion 29P is a periphery of the extension portion 292 at one end thereof in the width direction W7. Specifically, the peripheral portion 29P connects to the corner portion 29N1 of the third abutting portion 29N at one end thereof in the longitudinal direction L9. That is, the peripheral portion 29P and the third abutting portion 29N share the corner portion 29N1. The peripheral portion 29P also shares, with the peripheral portion 29E, the corner portion 29E1 that is at the other end thereof in the longitudinal direction L9 separated from the corner portion 29N1. The peripheral portion 29P extends in the longitudinal direction L9 between the corner portion 29N1 and the corner portion 29E1.

With reference to FIG. 13, the holding member 29 is attached to the base portion 241 in such a way as to satisfy the following conditions (1) and (2). The condition (1) is that the first abutting portion 29M extends along the first end surface 241J. The condition (2) is that the interposed portion 291 is inserted in a space that is formed by the second end surface 241K, the fourth end surface 242E, and the end surface 28A of the filter 28 in the storage portion 26.

More specifically, in the interposed portion 291, the first peripheral portion 29G is positioned in such a way as to be separated from the second end surface 241K and the fourth end surface 242E in the fifth direction L5 by a third specific distance SD7 that is smaller than the second specific distance TD12, and extend in the fourth direction W4. In this case, the second peripheral portion 29H extends from the corner portion 29G1 of the first peripheral portion 29G (see FIG. 11) in the fifth direction L5 by the fourth specific distance SD16. Here, when the holding member 29 is attached to the storage portion 26, the corner portion 29G1 becomes an end portion of the first peripheral portion 29G at one end thereof in the third direction W3 (namely, on the left side). In addition, the third peripheral portion 29J extends in the fourth direction W4 from the corner portion 29H1 of the second peripheral portion 29H that is at an end thereof in the fifth direction L5 (see FIG. 11). The corner portion 29H1 is an end portion of the second peripheral portion 29H in the fifth direction L5. In addition, the specific portion of the first wire 27A is disposed more on the fifth direction L5 side than the first peripheral portion 29G. In addition, the specific portion of the first wire 27A is disposed more on the fourth direction W4 side than the second peripheral portion 29H, and closer to one side of the sixth direction L2 (namely, more on the sixth direction L6 side) than the third peripheral portion 29J. This allows the interposed portion 291 to be interposed between the inner peripheral portion 26A of the storage portion 26 and the specific portion of the first wire 27A. As a result, the first wire 27A hardly abuts on the second end surface 241K and the fourth end surface 242E. This makes it possible to restrict the first wire 27A inserted in the filter 28 from being damaged.

In the position regulating portion 293, the first abutting portion 29M includes the sixth end portion 29L1 and the seventh end portion 29M1 that are separated from each other in the second direction L2 by the fifth specific distance TD13, and the first abutting portion 29M extends along the first end surface 241J. The second abutting portion 29L extends from the sixth end portion 29L1 (see FIG. 11) in the fourth direction W4, and abuts on the end surface 28A of the filter 28 stored in the storage portion 26. The third abutting portion 29N extends from the seventh end portion 29M1 in the fourth direction W4, and abuts on the end surface 28B of the filter 28. In other words, the position regulating portion 293 abuts on the filter 28 stored in the storage portion 26 from two sides of the second direction L2 perpendicular to the first direction D1, and from one side of the third direction W3 perpendicular to the first direction D1 and the second direction L2. This allows the position regulating portion 293 to regulate the position of the filter 28 in the storage portion 26. That is, the filter 28 is positioned in the operation/display portion 2 (namely, the electric device) such that the filter 28 hardly moves in the operation/display portion 2. As a result, the specific portion of the first wire 27A, too, hardly moves in the storage portion 26, and hardly contacts the inner peripheral portion 26A of the storage portion 26. This makes it possible to restrict the first wire 27A from being damaged.

In the position regulating portion 293, the third abutting portion 29N protrudes in the sixth direction L6 from the third end surface 241L by a distance that is obtained by subtracting an added value of the distance TD3 (see FIG. 11) and the second specific distance TD12 from the first specific distance SD2. In this case, it is preferable that the third abutting portion 29N protrudes in the sixth direction L6 from the upper end portion of the second wire 27B. This makes it possible to restrict the filter 28 from contacting and applying stress on the second wire 27B. This restricts the second wire 27B from being damaged.

Figure 14:
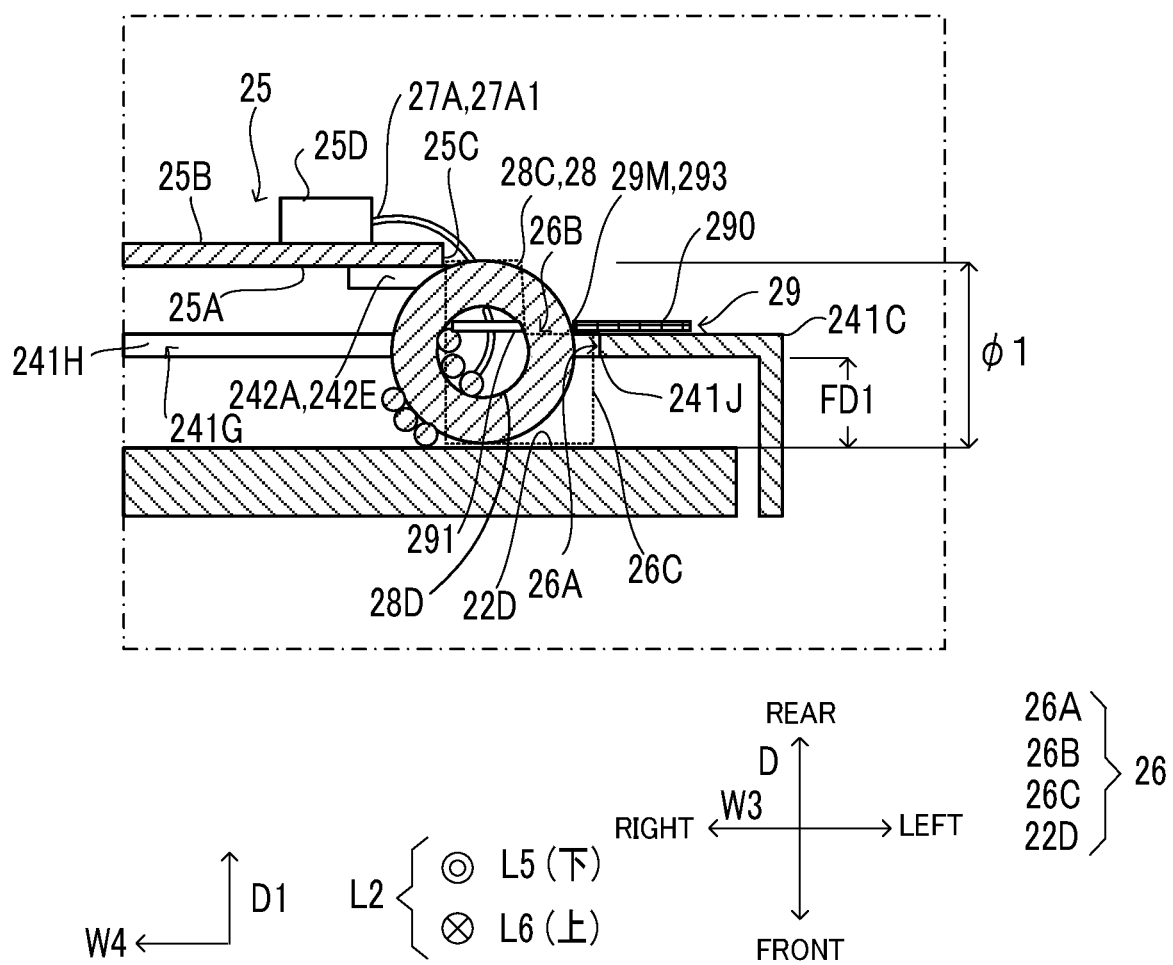
FIG. 14 is a perspective diagram showing a relationship between a position regulating portion of the holding member in FIG. 11 and the storage portion.

FIG. 14 shows that the filter 28 includes the outer peripheral surface 28C having the outer diameter φ01. The first end surface 241J is separated from the bottom portion 22D by the sixth specific distance FD1 that is larger than φ01/2. The fifth end surface 25C is separated from the bottom portion 22D by a distance that is larger than the sixth specific distance FD1. In the position regulating portion 293, the first abutting portion 29M protrudes in the fourth direction W from the first end surface 241J4, and abuts on the outer peripheral surface 28C of the filter 28 stored in the storage portion 26. In addition, the first abutting portion 29M presses the outer peripheral surface 28C of the filter 28 in the fourth direction W4, and causes the outer peripheral surface 28C to abut on the fifth end surface 25C. Since the first abutting portion 29M is elastic, the configuration makes it possible to regulate the filter 28 from moving in the front-rear direction D. Accordingly, even when the operation/display portion 2 pivots (see FIG. 1), it is possible to prevent rattle of the filter 28 in the storage portion 26. In this way, since the first wire 27A is stably locked to the cut portion 291A, it is possible to restrict the first wire 27A from being damaged. In addition, since it is possible to prevent the filter 28 from abutting on the second wire 27B, it is possible to restrict the second wire 27B from being damaged.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An electric device comprising:
a substrate on which an electronic circuit is mounted;
a first wire including a base end portion that is electrically connected with the electronic circuit;
a filter having a through hole in which the first wire is inserted;
a storage portion including a bottom portion and an inner peripheral portion and configured to store the filter with the first wire inserted in the through hole thereof and store a specific portion of the first wire, the specific portion extending from the base end portion to the filter, the inner peripheral portion defining a shape of an opening at a position separated from the bottom portion in a first direction;
a holding member formed from a flexible material and attached to the storage portion so as to protrude from the inner peripheral portion toward the opening; and
a frame portion including a base portion and an attachment portion to which the substrate is attached, the base portion being separated in the first direction from the bottom portion, wherein
the holding member includes:
an interposed portion interposed between the inner peripheral portion and the specific portion; and
a position regulating portion configured to abut on the filter stored in the storage portion, from two sides of a second direction that is perpendicular to the first direction, and from one side of a third direction that is perpendicular to the first direction and the second direction, in such a way as to regulate a position of the filter in the storage portion,
the base portion includes a first end surface, a second end surface, and a third end surface that are included in the inner peripheral portion,
the first end surface includes a first end portion and a second end portion that are separated from each other in the second direction by a first specific distance that is larger than a size in the second direction of the filter stored in the storage portion, the first end surface extending from the first end portion to the second end portion and defining a shape of the opening at one end thereof in the third direction,
the second end surface includes a third end portion that is separated from the first end portion in a fourth direction that is directed from one side of the third direction to another side of the third direction, the second end surface extending from the first end portion to the third end portion and defining a shape of the opening at one end thereof in the second direction,
the third end surface includes a fourth end portion that is separated from the second end portion in the fourth direction, the third end surface extending from the second end portion to the fourth end portion and defining a shape of the opening at another end thereof in the second direction, the attachment portion includes a fourth end surface that is included in the inner peripheral portion of the storage portion, the fourth end surface includes a fifth end portion that is separated from the third end portion in both the first direction and the fourth direction, the fourth end surface extending from the third end portion to the fifth end portion in the first direction and then in the fourth direction, and defining a shape of the opening at the one end thereof in the second direction, in a state where the substrate is attached to the attachment portion, the substrate includes a fifth end surface that is separated from the first end surface in the fourth direction, and the fifth end surface abuts on an end portion of the fourth end surface at one end thereof in the first direction, and extends from the fourth end surface in a fifth direction that is directed from one side of the second direction to another side of the second direction.

2. The electric device according to claim 1, wherein the holding member has a sheet-like shape.

3. The electric device according to claim 1, wherein the interposed portion extends from the first end surface toward the fifth end surface along the second end surface and the fourth end surface, and a cut portion in which the specific portion is fitted, is provided at a tip of the interposed portion in the fourth direction.

4. The electric device according to claim 3, wherein the filter is surrounded by the first end surface, the second end surface, the third end surface, the fourth end surface, and the fifth end surface, and is stored in the storage portion in such a way as to be separated from the second end surface in the fifth direction by a second specific distance, the specific portion of the first wire is stored in a portion of the storage portion between the filter and the fourth end surface, the cut portion includes:
  a first peripheral portion that is separated from the second end surface in the fifth direction by a third specific distance that is shorter than the second specific distance, the first peripheral portion extending in the fourth direction, and the specific portion is disposed more on the fifth direction side than the first peripheral portion.

5. The electric device according to claim 4, wherein the cut portion further includes:
  a second peripheral portion that extends in the fifth direction from an end portion of the first peripheral portion at one end thereof in the third direction, by a fourth specific distance that is determined based on a thickness of the first wire; and a third peripheral portion that extends in the fourth direction from an end portion of the second peripheral portion at one end thereof in the fifth direction, and the specific portion of the first wire is disposed more on the fourth direction side than the second peripheral portion, and closer to the one side of the second direction than the third peripheral portion.

6. The electric device according to claim 1, wherein the position regulating portion includes:
  a first abutting portion that includes a sixth end portion and a seventh end portion that are separated from each other in the second direction by a fifth specific distance that corresponds to the size of the filter, the first abutting portion extending between the sixth end portion and the seventh end portion along the first end surface;
  a second abutting portion that extends in the fourth direction from the sixth end portion; and
  a third abutting portion that extends in the fourth direction from the seventh end portion, and the second abutting portion abuts on the filter stored in the storage portion from the one side of the second direction, and the third abutting portion abuts on the filter from the other side of the second direction.

7. The electric device according to claim 6, further comprising:
  a second wire that is electrically connected with the electronic circuit, and is disposed close to the third end surface in a sixth direction that is directed from the other side of the second direction to the one side of the second direction, wherein the third abutting portion protrudes in the sixth direction from an end portion of the second wire at one end thereof in the sixth direction.

8. The electric device according to claim 6, wherein the filter includes an outer peripheral surface having a predetermined outer diameter, the first end surface and the fifth end surface are separated from the bottom portion by a sixth specific distance that is larger than a half of the outer diameter of the filter, and the first abutting portion protrudes in the fourth direction from the first end surface in such a way as to abut on the outer peripheral surface of the filter stored in the storage portion, and causes the outer peripheral surface of the filter to abut on the fifth end surface.

9. The electric device according to claim 1, wherein the opening is a space surrounded by the first end surface, the second end surface, the third end surface, the fourth end surface, and the fifth end surface.

10. A display device comprising:
the electric device according to claim 1; and
a display portion configured to display an image based on image data transmitted from the electronic circuit.

* * * * *